(12) United States Patent
Fisher et al.

(10) Patent No.: US 11,059,503 B2
(45) Date of Patent: Jul. 13, 2021

(54) SYSTEMS AND METHODS FOR RAIL WORKER AND RAIL VEHICLE WARNING AND POSITION DETERMINATION

(71) Applicant: Willowglen Systems Inc., Edmonton (CA)

(72) Inventors: Douglas Grant Fisher, Edmonton (CA); Robert Donovan, Edmonton (CA); Craig Ryan van der Veen, Edmonton (CA); Carl William Lorimer, Edmonton (CA)

( * ) Notice: Subject to any disclaimer, the term of this patent is extended or adjusted under 35 U.S.C. 154(b) by 0 days.

(21) Appl. No.: 16/696,918

(22) Filed: Nov. 26, 2019

(65) Prior Publication Data

US 2021/0155275 A1    May 27, 2021

(51) Int. Cl.
| | |
|---|---|
| *B61L 23/06* | (2006.01) |
| *B61L 23/34* | (2006.01) |
| *B61L 3/00* | (2006.01) |
| *H04B 17/318* | (2015.01) |
| *B61L 15/00* | (2006.01) |
| *G08B 21/02* | (2006.01) |
| *B61L 3/12* | (2006.01) |

(52) U.S. Cl.
CPC ............. *B61L 23/06* (2013.01); *B61L 3/008* (2013.01); *B61L 3/12* (2013.01); *B61L 15/0072* (2013.01); *B61L 23/34* (2013.01); *G08B 21/02* (2013.01); *H04B 17/318* (2015.01)

(58) Field of Classification Search
CPC .. B61L 23/06; B61L 3/12; B61L 3/008; B61L 15/0072; B61L 23/34; H04B 17/318; G08B 21/02
See application file for complete search history.

(56) References Cited

U.S. PATENT DOCUMENTS

| | | | |
|---|---|---|---|
| 6,954,649 | B2 | 10/2005 | Kotzin |
| 7,233,799 | B2 | 6/2007 | Spain, Jr. |
| 7,286,835 | B1 | 10/2007 | Dietrich et al. |
| 7,383,051 | B2 | 6/2008 | Spain, Jr. et al. |

(Continued)

FOREIGN PATENT DOCUMENTS

| | | |
|---|---|---|
| AU | 676302 B2 | 10/1994 |
| EP | 2045613 A1 | 8/2009 |

(Continued)

*Primary Examiner* — James J Yang
(74) *Attorney, Agent, or Firm* — Bennett Jones LLP

(57) ABSTRACT

System and methods are provided for warning a worker of a rail vehicle, or an operator of the rail vehicle of the worker. The system includes a worker device, a vehicle device, and a central server. The devices and server operate on one or a combination of actual or simulated satellite navigational signals, and beacon signals to determine the position of the devices, to generate a warning. The position determination may prioritize beacon signals over satellite navigation signals. The position determination may involve correcting a calculated position based on a measured power level of the beacon signal received from the beacon transmitter, an elapsed time since a previous beacon signal was last received by the device from the beacon transmitter, an elapsed time since a previous satellite navigation signal was received by the device, or an accuracy of the position of the device based on the satellite navigation signal.

18 Claims, 13 Drawing Sheets

(56) References Cited

U.S. PATENT DOCUMENTS

| | | |
|---|---|---|
| 7,406,116 B2 | 7/2008 | Agrawala et al. |
| 7,561,101 B1 | 7/2009 | Tester et al. |
| 7,706,811 B2 | 4/2010 | Shkedi |
| 7,818,017 B2 | 10/2010 | Alizadeh-Shabdiz et al. |
| 8,068,855 B2 | 11/2011 | Dressler et al. |
| 8,145,185 B2 | 3/2012 | Gunasekara |
| 8,344,877 B2 | 1/2013 | Sheardown et al. |
| 8,442,553 B2 | 5/2013 | Cardona et al. |
| 8,489,112 B2 | 7/2013 | Roeding et al. |
| 8,559,975 B2 | 10/2013 | Lin et al. |
| 8,644,844 B2 | 2/2014 | Shapira et al. |
| 8,738,032 B2 | 5/2014 | Ziskind et al. |
| RE45,260 E | 11/2014 | Bahl et al. |
| 9,146,113 B1 | 9/2015 | Funk et al. |
| 9,542,852 B2 | 1/2017 | Cross et al. |
| 9,674,684 B1 | 6/2017 | Mendelson |
| 2002/0091483 A1* | 7/2002 | Douet .................. B61L 25/025 701/408 |
| 2012/0232726 A1* | 9/2012 | Nandedkar ............ B61L 3/008 701/19 |
| 2015/0025716 A1* | 1/2015 | Orion ...................... B61L 25/02 701/19 |
| 2019/0208492 A1* | 7/2019 | Maruta ..................... G01S 5/14 |
| 2021/0016812 A1* | 1/2021 | Fiquet ................ B61L 27/0005 |

FOREIGN PATENT DOCUMENTS

| | | |
|---|---|---|
| EP | 1726169 B1 | 10/2014 |
| WO | 2000069198 A1 | 11/2000 |
| WO | 2013056244 A1 | 4/2013 |

* cited by examiner

SYSTEMS AND METHODS FOR RAIL WORKER AND RAIL VEHICLE WARNING AND POSITION DETERMINATION

FIELD OF THE INVENTION

The present invention relates to systems and methods for warning a worker of a rail vehicle, or vice versa, which may be used to reduce the risk of a collision between them. The present invention also relates to systems and methods for determining the position of a vehicle device onboard the rail vehicle and of a worker device carried by the worker.

BACKGROUND OF THE INVENTION

The prior art includes systems for warning a trackside worker of a rail vehicle, which may be used to reduce the risk of a collision between the worker and the rail vehicle.

The Protran Collision Avoidance System™ (Protran Technology; Newton, N.J., USA) is believed to include a train-mounted unit in radio communication with a worker-wearable personal alert device (PAD). When the train-mounted unit and the worker-wearable PAD are within range of each other, the train-mounted unit provides an audio-visual alert to the train operator, and the PAD provides an audio-visual alert to the worker.

U.S. Pat. No. 8,344,877 B2 (Sheardown et al.; 2013 Jan. 1) describes a track worker safety system. A wearable worker identifier device (an RFID tag) continuously emits information. A receiver receives the information. A central processing unit in communication with a detector (an RFID reader) determines the position of the worker based on at least one of the information received from the worker identifier device, information pertaining to the detector that received the information from the worker identifier device, and information about the position of a rail vehicle. The central processing unit may also be in communication with an RFID reader onboard the rail vehicle, which reads RFID tags embedded on the rail road. The central processing unit may also receive location information from a GPS system to determine the speed, position, and direction of movement of the worker and rail vehicle. The central processing unit communicates with the worker device to provide a warning to the worker of the position of the rail vehicle.

PCT International Application no. WO 2013/056244 A1 (Cross et al.; 2013 Apr. 18) and U.S. Pat. No. 9,542,852 B2 (Cross et al.; 2017 Jan. 10) describe a mass transit safety notification system and device to notify workers of approaching rail vehicles. The system includes a vehicle computer unit (VCU) onboard a train, and a personal notification unit (PNU) worn or carried by a worker. The VCU transmits location-based information to the PNU via a network. The PNU determines whether to transmit an alert mode and transmit a warning, based on the information received from the VCU, and the position of a warning zone. The PNU may also send a signal to a central control server of a potential safety issue.

For the purpose of trackside worker safety, it is important to determine the position of the worker and the rail vehicle with accuracy and reliability, particularly in higher risk locations such as light rail transit stations, track switching locations, and tunnel entrances and exits where visibility is limited. In this regard, position determination based on a single signal or a single signal type can be suboptimal. Position determination using a ground-based RF signal transmitter and a receiver tends to degrade in accuracy and reliability as the distance between the transmitter and receiver increases. GPS-based positioning allows for high accuracy in general, but can exhibit significant, transient, and unpredictable inaccuracies, even when the strength of received GPS signals is strong. For example, in urban environments, tunnels block reception of satellite navigation signals by GPS receivers onboard rail vehicles. When rail vehicles exit tunnels, the lag time needed for onboard GPS receivers to re-establish reception of GPS signals and determine their position can result in position inaccuracies of more than a kilometer. Further, tall buildings create "urban canyons" that reflect GPS signals and result in indirect signal paths to GPS signals. A variety of other environmental factors also unpredictably degrade the accuracy of GPS-based positioning.

Notwithstanding the prior art systems, there remains a need for improved systems for warning a trackside worker of a rail vehicle, and for determining the position of the worker and the rail vehicle. It may be desirable to avoid the need for radio frequency communication directly between devices carried by the worker and onboard the rail vehicle. It may be desirable for such systems to operate in a variety of environments, including environments where reception of GPS signals from satellites is impaired or not possible. It may be desirable for such systems to be able to avoid reliance on a single signal type for determining the location of the worker and the rail vehicle. It may be desirable to limit the amount of trackside infrastructure that needs to be installed, which itself can be a hazardous activity for a worker. It may be desirable for the system to be readily configurable to warn the worker of different hazard conditions, without the need for reconfiguration of the devices carried by the worker and onboard the rail vehicle.

SUMMARY OF THE INVENTION

In one aspect, the present invention comprises a method for determining a position of a worker or a rail vehicle. The method comprises the steps of:
  (a) providing a device adapted to be either carried by the worker or placed onboard the rail vehicle, the device comprising a receiver for receiving a beacon signal from each of a plurality of beacon transmitters; and
  (b) receiving at the device a beacon signal from each of a plurality of beacon transmitters;
  using at least one processor, performing the further steps of:
  (c) for each one of the beacon transmitters:
    (i) determining a power level of the beacon signal as received at the device from the one of the beacon transmitters;
    (ii) calculating an estimated distance, D1, between the beacon transmitter and an initial value for a calculated position of the device based on the power level of the beacon signal received from the beacon transmitter;
    (iii) calculating a distance, D2, between the beacon transmitter and the initial value for the calculated position of the device;
    (iv) calculating a correction, $\Delta_B$, to the initial value of the calculated position of the device, based on a quantitative relationship in the form $\Delta_B = K_3 \times (D_2 - D_1)$, wherein $K_B$ is a constant based on a quantitative relationship that negatively correlates $K_B$ to at least one or both of
      (A) the measured power level of the beacon signal received from the beacon transmitter; and (B) an elapsed time since a previous beacon signal was last received by the device from the beacon transmitter;

(d) calculating a corrected calculated position of the device based on the initial value of the calculated position of the device and the corrections, $\Delta_B$; and (e) outputting the corrected calculated position of the device as the position of the device.

In one embodiment of the method, the constant, $K_3$, is based on the quantitative relationship that negatively correlates $K_3$ to the measured power level of the beacon signal received from the beacon transmitter.

In one embodiment of the method, the constant, $K_3$, is based on the quantitative relationship that negatively correlates $K_3$ to the elapsed time since the previous beacon signal was last received by the device from the beacon transmitter.

In one embodiment of the method, the method comprises the further steps of:

(a) receiving at the device a satellite navigation signal, and determining a position of the device based on the satellite navigation signal;

(b) using the at least one processor, calculating a distance, $D_{SNS}$, between the position of the device based on the satellite navigation signal and the initial value for the calculated position of the device; and (c) using the at least one processor, calculating a correction, $\Delta_{SNS}$, to the calculated position of the device, based on a quantitative relationship $\Delta_{SNS}=K_{SNS}\times D_{SNS}$, wherein $K_{SNS}$ is a constant based on a quantitative relationship that negatively correlates $K_{SNS}$ to at least one or both of:

(i) an elapsed time since a previous satellite navigation signal was received by the device; and (ii) an accuracy of the position of the device based on the satellite navigation signal; and wherein the step of calculating the corrected calculated position of the device is further based on the correction, $\Delta_{SNS}$.

In one embodiment of the method, the constant $K_{SNS}$ is based on the quantitative relationship that negatively correlates $K_{SNS}$ to the elapsed time since the previous satellite navigation signal was received by the device.

In one embodiment of the method, the constant $K_{SNS}$ is based on the quantitative relationship that negatively correlates $K_{SNS}$ to the accuracy of the position of the device based on the satellite navigation signal.

In another aspect, the present invention comprises a system for determining a position of either a worker or a rail vehicle. The system comprises a device adapted to be either carried by the worker or placed onboard the rail vehicle, the device comprising a receiver for receiving a beacon signal from each of a plurality of beacon transmitters. The system further comprises at least one processor in communication with the receiver of the device, and operatively connected to a non-transient computer readable medium storing instructions executable by the processor to implement the processor-performed steps of one or more of the embodiments of the method described above.

In another aspect, the present invention comprises a computer program product for determining a position of either a worker or a rail vehicle, for use with a device adapted to be either carried by the worker or placed onboard the rail vehicle, the device comprising either one or a both of a receiver for receiving a beacon signal from each of a plurality of beacon transmitters and a satellite navigation signal receiver module for determining a position of the device based on the satellite navigation signal, the computer program product comprising a non-transient computer readable medium storing instructions executable by a processor to implement the processor-performed steps of one or more of the embodiments of the method described above.

In another aspect, the present invention comprises a system for warning a worker of a rail vehicle, or an operator of the rail vehicle of the worker. The system comprises a satellite navigation signal simulator for radiating satellite navigation signals. The system further comprises a worker device adapted for carrying by the worker, wherein the worker device comprises: a first receiver for receiving satellite navigation signals; a first transceiver for transceiving data via a communications network; a first output device comprising one or a combination of a first display device, a first speaker, and a first vibrator; a first processor operatively connected to the first receiver, the first transceiver, the first output device, and a first non-transitory computer readable medium storing instructions readable by the first processor to implement a first method comprising the steps of:

(a) determining one or a combination of position, speed, or direction (kinematic data) of the worker device based at least on satellite navigation signals received by the first receiver;

(b) causing the first transceiver to transmit the determined kinematic data of the worker device via the communications network; and (c) causing the first output device to generate a visual, audible, or haptic warning in response to notification data received by the first transceiver via the communications network.

The system further comprises a vehicle device adapted to be placed onboard the rail vehicle, wherein the vehicle device comprises: a second receiver for receiving satellite navigation signals; a second transceiver for transceiving data via the communications network; a second output device comprising one or a combination of a second display device, a second speaker, and a second vibrator; a second processor operatively connected to the second receiver, the second transceiver, the second output device, and a second non-transitory computer readable medium storing instructions readable by the second processor to implement a second method comprising the steps of:

(a) determining one or a combination of position, speed, or direction (kinematic data) of the vehicle device based at least on satellite navigation signals received by the second receiver;

(b) causing the second transceiver to transmit the determined kinematic data of the vehicle device via the communications network; and (c) causing the output device to generate a visual, audible, or haptic warning in response to notification data received by the second transceiver via the communications network.

The system further comprises a central server comprising: a third transceiver for transceiving data via the communications network; and a third processor operatively connected to the transceiver, and a third non-transitory computer readable medium storing instructions readable by the third processor to implement a third method comprising the steps of:

(a) determining if a safety rule is violated based at least on one or a combination of the kinematic data of the worker device, and the kinematic data of the vehicle device received by the third transceiver; and (b) if the safety rule is violated, causing the third transceiver to transmit notification data to one or a combination of the worker device, and the vehicle device via the communications network.

In another aspect, the present invention comprises a system for warning a worker of a rail vehicle, or an operator of the rail vehicle of the worker. The system comprises a plurality of beacon transmitters for radiating beacon signals along the railway. The system further comprises a worker device adapted for carrying by the worker, wherein the worker device comprises: a first receiver for receiving beacon signals; a first transceiver for transceiving data via a communications network; a first output device comprising one or a combination of a first display device, a first speaker, and a first vibrator; a first processor operatively connected to the first receiver, the first transceiver, the output device, and a non-transitory computer readable medium storing instructions readable by the first processor to implement a first method comprising the steps of:

(a) determining a received signal strength of beacon signals received by the first receiver;
(b) causing the first transceiver to transmit the determined received signal strength of beacon signals received by the first receiver via the communications network; and
(c) causing the output device to generate a visual, audible, or haptic warning in response to notification data received by the first transceiver via the communications network.

The system further comprises a vehicle device adapted to be placed onboard the rail vehicle, wherein the vehicle device comprises: a second receiver for receiving beacon signals; a second transceiver for transceiving data via the communications network; a second output device comprising one or a combination of a second display device, a second speaker, and a second vibrator; a second processor operatively connected to the second receiver, the second transceiver, the second output device, and a second non-transitory computer readable medium storing instructions readable by the second processor to implement a second method comprising the steps of:

(a) determining a received signal strength of beacon signals received by the second receiver;
(b) causing the second transceiver to transmit the determined strength of beacon signals received by the second receiver via the communications network; and
(c) causing the second output device to generate a visual, audible, or haptic warning in response to notification data received by the second transceiver via the communications network;

The system further comprises a central server comprising: a transceiver for transceiving data via the communications network; and a processor operatively connected to the transceiver, and a non-transitory computer readable medium storing instructions readable by the processor to implement a third method comprising the steps of:

(a) determining one or a combination of position, speed, or direction (kinematic data) of the worker device based at least on the received signal strength of beacon signals received by the first receiver, as received by the third transceiver via the communications network;
(b) determining one or a combination of position, speed, or direction (kinematic data) of the vehicle device based at least on the received signal strength of beacon signals received by the second receiver, as received by the third transceiver via the communications network;
(c) determining if a safety rule is violated based at least on one or a combination of the kinematic data of the worker device, and the kinematic data of the vehicle device received by the transceiver; and
(d) if the safety rule is violated, causing the transceiver to transmit notification data to one or a combination of the worker device, and the vehicle device via the communications network.

A method for warning a worker of a rail vehicle, or for warning an operator of the rail vehicle of the worker, the method implemented by a device carried by the worker, or placed onboard the rail vehicle, the device comprising: a first receiver for receiving beacon signals; a second receiver for receiving satellite navigation signals; a transceiver for transceiving data via a communications network; an output device comprising one or a combination of a display device, a speaker, and a vibrator; and a processor operatively connected to the first receiver, the second receiver, the transceiver, the output device, and a non-transitory computer readable medium storing instructions readable by the processor to implement the method, the method comprising the steps of:

(a) determining if beacon signals are received by the first receiver, and if so, then:
  (i) determining a received signal strength of beacon signals received by the first receiver; and
  (ii) causing the transceiver to transmit the determined strength of beacon signals received by the first receiver via the communications network; and
(b) if it is determined that beacon signals are not received by the first receiver, then determining if satellite navigation signals are received by the second receiver, and if so, then:
  (i) determining one or a combination of position, speed, or direction (kinematic data) of the device based at least on satellite navigation signals received by the second receiver; and
  (ii) causing the transceiver to transmit the determined kinematic data of the device via the communications network; and
(c) causing the output device to generate a visual, audible, or haptic warning in response to notification data received by the transceiver via the communications network, wherein the notification data is based at least on either the transmitted determined strength of beacon signals received by the first receiver, or the transmitted determined kinematic data of the device.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Figure 1:
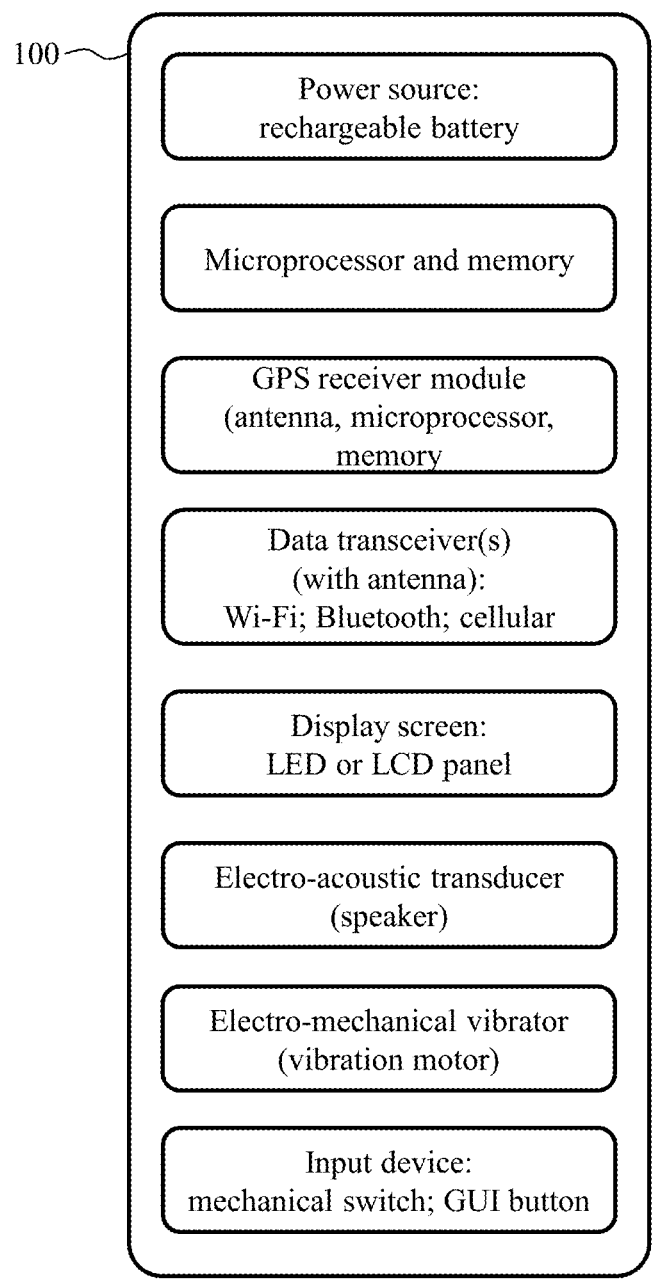
FIG. 1 shows a block diagram of an embodiment of a worker device used in a system of the present invention.

The invention relates to systems, methods, and computer program products for warning a worker of a rail vehicle, or an operator of the rail vehicle of the worker, which may be used to reduce the risk of a collision between the worker and the rail vehicle. The invention also relates to systems, methods, and computer program products for determining the position of a vehicle device onboard the rail vehicle and of a worker device carried by the worker.

Any term or expression not expressly defined herein shall have its commonly accepted definition understood by a person skilled in the art. As used herein, the following terms have the following meanings.

"Beacon transmitter" refers to a Earth-based electronic device that transmits a radio frequency signal (a beacon signal), which allows the position of a receiving device to be determined based on one or a combination of data encoded in the beacon signal, and a power or strength of the received beacon signal. Non-limiting examples of a beacon transmitter include a Bluetooth beacon transmitter, or an ultra-wide band (UWB) transmitter.

"Leaky feeder" (also known as a "leaky coaxial cable", "leaky coax" or "radiating cable") refers to a coaxial cable that is capable of radiating a radio frequency signal at a gap, slot, or other discontinuity in its insulating layer surrounding its conductive core, which insulating layer would otherwise prevent or limit radiation of the radio frequency signal.

"Memory" refers to a non-transitory tangible medium for storing information in a format readable by a processor, and/or instructions readable by a processor to implement an algorithm. Non-limiting types of memory include solid-state, optical, and magnetic based computer readable media.

"Processor" refers to one or more electronic devices that are capable of reading and executing instructions stored on a memory to perform operations on data, which may be stored on a memory or provided in a data signal. Non-limiting examples of processors include devices referred to as microprocessors, microcontrollers, central processing units (CPU), and digital signal processors.

"Quantitative relationship" refers to a relationship, which can be used by a processor, to determine a value of a variable based on a value of at least one other variable. Non-limiting forms of quantitative relationships include a mathematical function, a data point set (e.g., in the form of a lookup table or associative array), a best-fit curve applied to a data point set, or a Boolean operator. Irrespective of the form of the quantitative relationship, a quantitative relationship to determine the numeric value of a variable, based on numerical values of a set of one or more variables ($\alpha_1, \alpha_2, \ldots \alpha_n$), may be symbolically represented herein by the notation: $\beta=f(\alpha_1, \alpha_2, \ldots \alpha_n)$. The present invention is not limited by the manner in which a quantitative relationship is determined. For example, a quantitative relationship may be based on either one or a combination of a rational model according to theory, and empirical data.

"Rail vehicle" refers to any machine that moves on a railway, whether the railway is situated above ground or below ground. Non-limiting examples of rail vehicles include trains and trams, such as may be used to transport people or goods, as well as maintenance vehicles.

"Satellite navigation signal" refers to a radio frequency signal originating from a satellite orbiting the Earth, which allows the position of a receiving device to be determined by processing the signal (e.g., by signal trilateration or other techniques). Non-limiting examples of satellite navigation signal include signals transmitted by the Global Positioning System (GPS), the Global Navigation Satellite System (GLONASS), the European Galileo positioning system, the Chinese Beidou Navigation Satellite System, and other regional satellite navigation systems.

"Satellite navigation signal receiver module" refers to an electronic device that includes an antenna for receiving satellite navigation signals, and an operatively connected processor that is configured with a set of instructions stored on a memory, to analyze such signals to determine the location of the module, and optionally, other information such as speed, and direction of movement of the module. As a non-limiting example, the module may analyze the signals by signal trilateration or other algorithms to determine the foregoing information. Satellite navigation signal receiver modules are known in the art, and do not, by themselves constitute the present invention. Persons skilled in the art may colloquially refer to a satellite navigation signal receiver module as a "GPS receiver," or a "GNSS receiver," depending on the type of satellite navigation signal used by the module.

"Satellite navigation signal simulator" refers to an Earth-based electronic device that transmits radio frequency signals that emulate satellite navigation signals transmitted by an orbiting satellite.

"Transceiver" refers to an electronic device comprising both a transmitter and a receiver for data signals.

"Worker" refers to a human being.

System.

Figure 2:
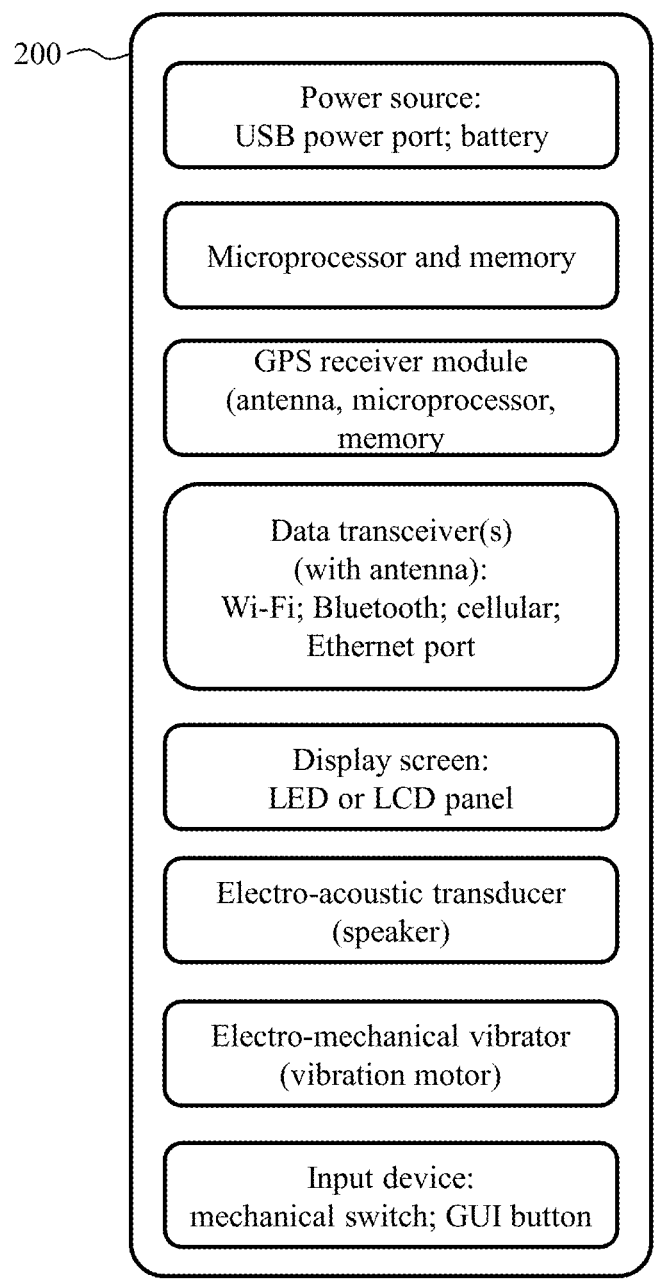
FIG. 2 shows a block diagram of an embodiment of a vehicle device used in a system of the present invention.
Figure 3:
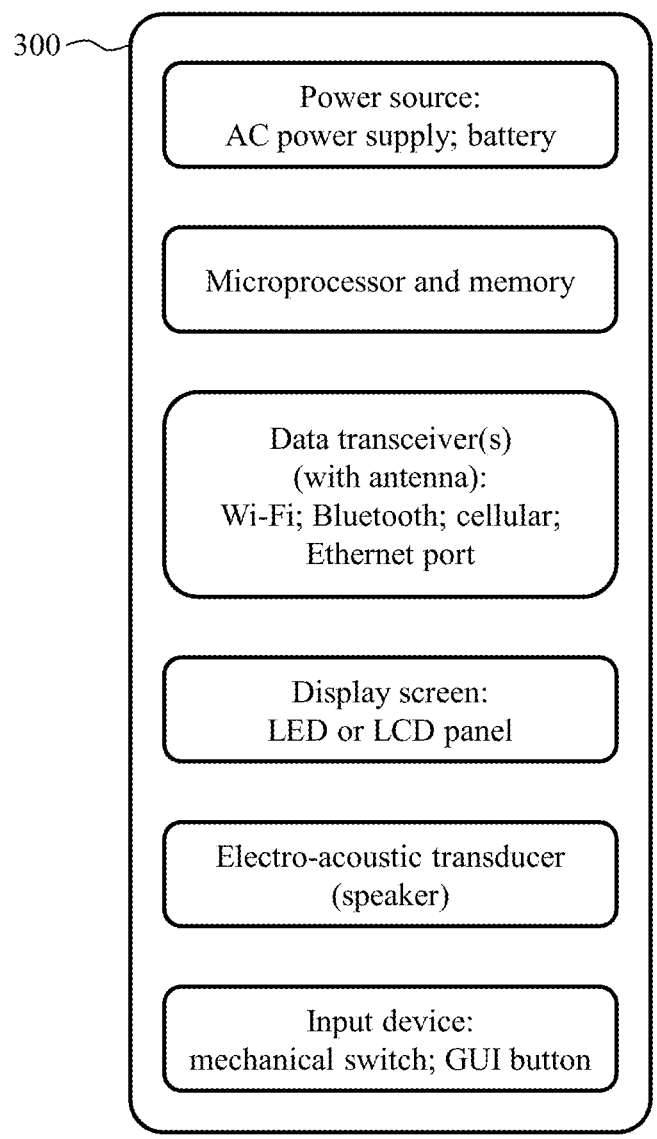
FIG. 3 shows a block diagram of an embodiment of a central server used in a system of the present invention.

FIG. 1, FIG. 2, and FIG. 3, show a block diagram of an embodiment of a worker device (100), a vehicle device (200), and a central server (300), respectively, used in a system of the present invention.

The worker device (100) is intended to be carried by a worker near a railway. The worker device may be adapted to be portable with the worker. As an example, the worker device (100) may be adapted for attachment to a wearable garment or item, with non-limiting examples including a safety vest, a helmet, an arm band, or a belt. Alternatively, the worker device (100) may have a form factor that allows it to be hand-held or placed in a pocket of a garment. All of the foregoing are examples of the worker device (100) being carried by the worker. In one embodiment, the worker device (100) may be implemented by a smartphone, or a tablet computer device.

The vehicle device (200) is intended to be placed onboard the rail vehicle. More particularly, the vehicle device (200) may be used by an operator in the cab of a rail vehicle. For example, the vehicle device (200) may be adapted with hardware for attachment to or installation in the cab of the rail, such as by attachment to a control panel of a rail vehicle. In one embodiment, the vehicle device (200) may be implemented by a smartphone, or a tablet computer device.

The central server (300) may be located remotely from the worker and the rail vehicle. As a non-limiting example, the central server (300) may be used by a human administrator of a rail transit system, and located at a central monitoring station of a rail transit system. Therefore, in one embodiment, the central server (300) may be implemented with a laptop or desktop computer, a smartphone, or a tablet computer device having input and output devices that allow the administrator to interact with the central server (300). In another non-limiting example, the central server (300) may perform its functions, without any interaction with a human user. Therefore, in another embodiment, the central server (300) may be implemented by a combined application, database, and web server that host software, data collections, and web page resources for the access by the worker device (100) and the vehicle device (200). The central server (300) may include multiple physically separate computers networked in a distributed computing system.

In the embodiments of FIG. 1, FIG. 2, and FIG. 3, the worker device (100), the vehicle device (200), and the central server (300), respectively, include operatively connected components shown in their respective Figures, as further described below. As further described below, it will be understood that one or more of the components may be optional, and therefore not present in other embodiments of the worker device (100), the vehicle device (200), and the central server (300).

A power source provides electrical power to the other components of the device (100 or 200) or the central server (300). As non-limiting examples: in the case of the worker device (100), the power source may a battery, such as a rechargeable lithium-ion battery; in the case of the vehicle device (200), the power source may be an AC power supply, a USB power port, which may be connected by a charging cable to a power supply of the rail vehicle, or a battery, such as a rechargeable lithium-ion battery; and in the case of the central server (300), the power source may be an AC power supply, or a battery, such as a rechargeable lithium-ion battery.

A microprocessor (i.e., a processor in the form of one or more integrated circuit(s)) executes instructions stored on an associated memory to enable the worker device (100), the vehicle device (200), or the central server (300) (as the case may be) to implement methods described below. As non-limiting examples: in the case of the worker device (100) and the vehicle device (200), the memory may a solid state memory device; and in the case of the central server (300), the memory may be a solid state memory device, or an optical disc. Although FIGS. 1 to 3 show the microprocessor and memory as a single discrete block from the other components, it will be understood that in some embodiments, the microprocessor and memory may comprise multiple components, some of which may be physically integrated with the other components, such as the satellite navigation signal receiver module (discussed below) and the data transceiver(s) discussed below.

In the case of the worker device (100), and the vehicle device (200), a satellite navigation signal receiver module (e.g., GPS receiver and associated antenna) receives satellite navigation signals (e.g., GPS signals), which are processed to determine a position of the worker device (100) or the vehicle device (200), as the case may be. The satellite navigation signal receiver module may be optional in embodiments where the worker device (100), and the vehicle device (200) exclusively use beacon signals for location determination.

Data transceivers permit the worker device (100), the vehicle device (200) or the central server (300) as the case may be to communicate data via a communications network. The transceivers may include one or more transceivers (and associated antenna) for transmitting and receiving radio-frequency signals in accordance with one or a combination of protocols and standards known to persons skilled in the art. As non-limiting examples, the protocol and standards may include Wi-Fi protocols (e.g., as defined by IEEE 802.11 local area network (LAN) protocol), Bluetooth protocols (e.g., as defined by Bluetooth Special Interest Group), cellular standards (e.g., GSM, 3GSM, 4G LTE, 5G NR, as defined by 3GPP, $3^{rd}$ Generation Partnership Project), and Terrestrial Trunked Radio (TETRA) standards (as defined by the European Telecommunications Standards Institute (ETSI)). In the case of the vehicle device (200) and the central server (300), the transceivers may also include an Ethernet port, for wired connection to a communications network. In the case of the central server (300), an Ethernet port for wired connection to a communications network may be the preferred data transceiver, in which case the aforementioned transceivers for wireless communication are optional.

The worker device (100) and the vehicle device (200) have an output device for providing a visual, audible, or haptic feedback to the worker, and the operator of the rail vehicle (respectively). Such output device may in the form of one or a combination of a display screen, an electro-acoustic transducer, and an electro-mechanical vibrator, as described below. Such output device is optional for the central server (300). For example, if the central server (300) is used as a workstation for a human administrator of a rail transit system, then it may be desirable for the central server (300) to include an output device. Alternatively, if the central server (300) is used only to host software, data collections, and web page resources, then such an output device is optional.

A display screen displays visual information in the form of text, graphics, or a combination thereof. As non-limiting examples, the display device may be a light emitting diode (LED) panel or a liquid crystal display (LCD) panel.

An electro-acoustic transducer (i.e., a speaker) generates an audible sound.

An electro-mechanical vibrator (e.g., a vibrating motor) generates vibrations to produce haptic feedback for a user.

An input device allows a user to provide input into the worker device (100), the vehicle device (200) or the central server (300), as the case may be. As a non-limiting example, the input device may be a button in the form of a mechanical switch. As a non-limiting example, the button may be a "virtual button" of a graphical user interface (GUI) displayed on the display screen, which may be pressed using a touch screen interface, or selected using another user interface device (e.g., a mouse, trackball, keyboard, and the like). An input device is optional for the central server (300). For example, if the central server (300) is used as a workstation for a human administrator of a rail transit system, then it may be desirable for the central server (300) to include an input device. Alternatively, if the central server (300) is used only to host software, data collections, and web page resources, then an input device is optional.

Method for warning a worker of a rail vehicle.

Figure 4:
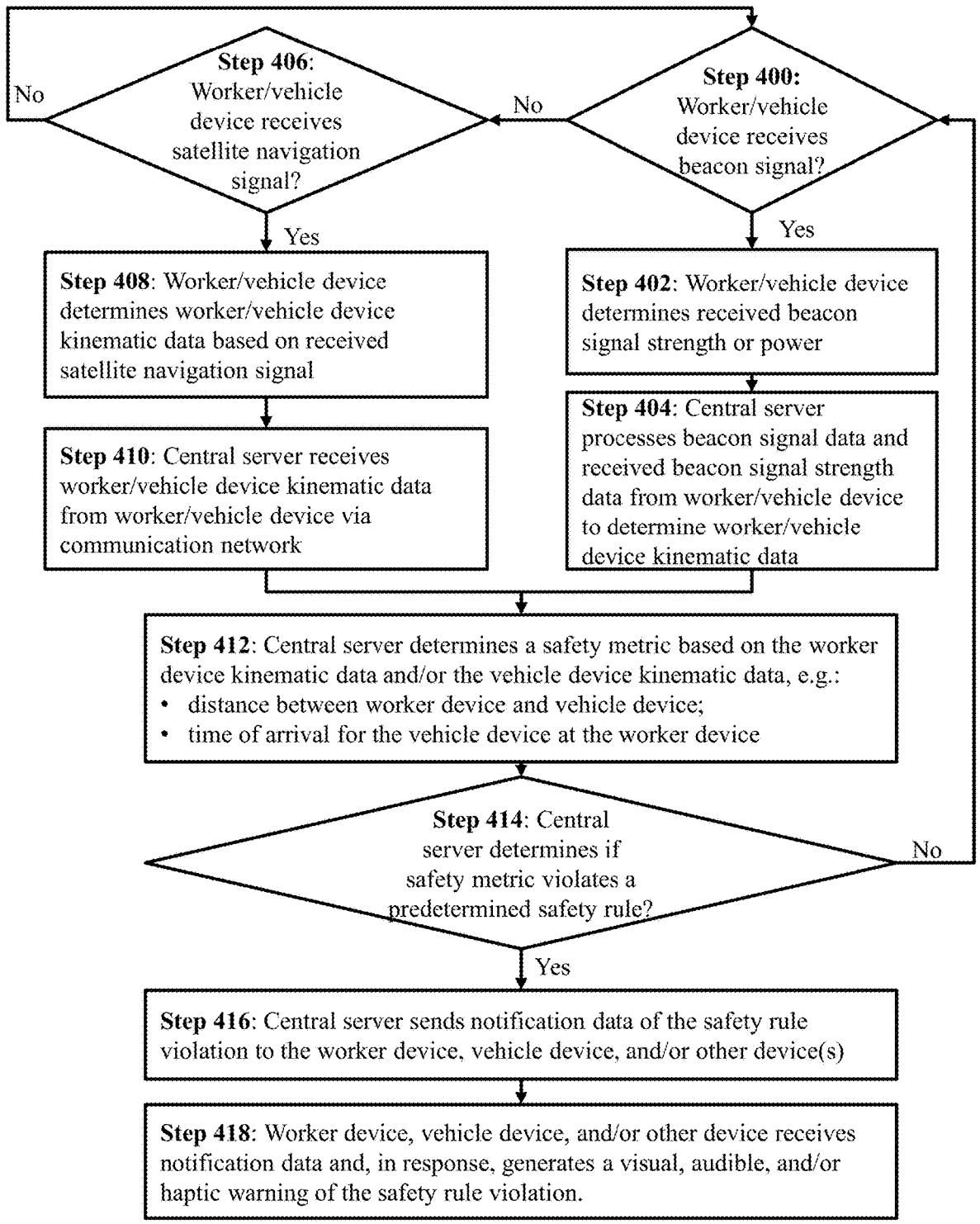
FIG. 4 shows a flow chart of an embodiment of a method of the present invention, for warning a worker of a moving rail vehicle, or an operator of the rail vehicle of the worker, implemented using the worker device, vehicle device, and central server of FIGS. 1, 2, and 3, respectively.

FIG. 4 shows a flow chart of an embodiment of a method of the present invention for warning a worker of a rail vehicle, which method is implemented using the worker device (100), vehicle device (200), and central server (300) of FIGS. 1, 2, and 3, respectively, and other components as may be shown in one of FIGS. 5 to 8. It will be understood that the method is implemented under the control of the processors of the worker device (100), the vehicle device (200), and the central server (300) by executing instructions stored in their respective operatively connected memories, to activate and/or control their respective operatively connected components. The steps of FIG. 4 may be repeatedly continuously or periodically to provide real-time warning to the worker, the operator of the rail vehicle, and to others. In FIGS. 5 to 8, the dashed lines between two parts indicate a communication network for data transmission between the two parts. The communication network includes one or more wireless data communication paths, and may also include one or more wired data communication paths.

Figure 5:
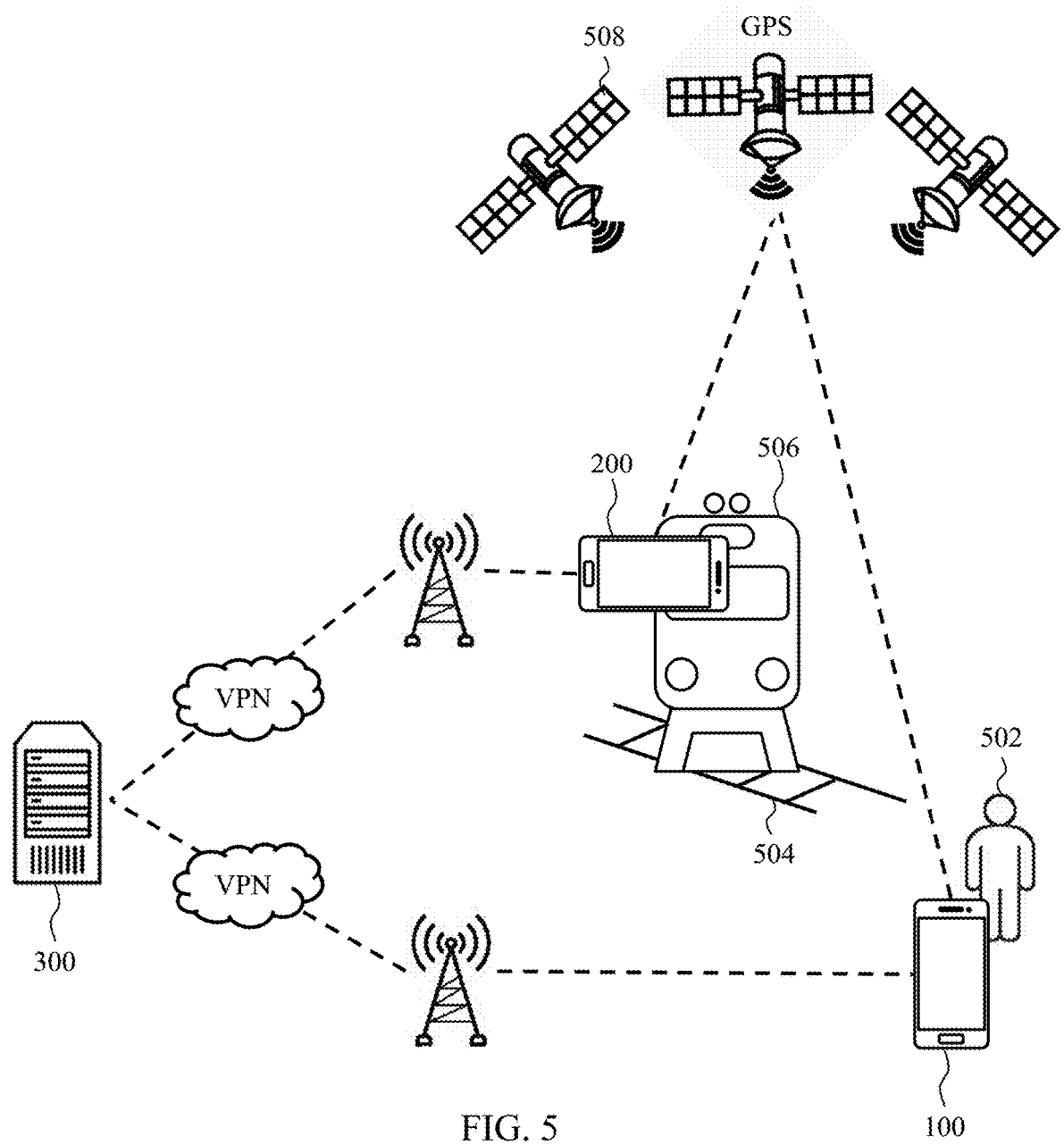
FIG. 5 shows a schematic depiction of an embodiment of a system of the present invention, in conjunction with a GPS satellite system.

For simplicity, FIG. 4 describes implementation of a method for a single worker device (100) associated with a single worker (502), and a single vehicle device (200) associated with a single rail vehicle (506), as shown in FIG. 5. It will be understood that the method may be implemented for multiple worker devices (100) each of which is associated with a different worker, and for multiple vehicle devices (200) each of which is associated with a different rail vehicle. That is, steps 400 to 410 may be carried out in respect to all of the multiple worker devices (100) and vehicle device (200), and steps 412 to 418 may be carried out in respect to each worker device (100) in relation to all vehicle devices (200), and in respect to each vehicle device (200) in relation to all worker devices (100). In this manner, the method may be utilized to monitor the safety of multiple workers and multiple rail vehicles in a rail transit system.

Referring to FIG. 5, prior to initiating the method, the worker device (100) is carried by the worker (502) near the railway (504), and the vehicle device (200) is onboard the rail vehicle (506). The power sources of the worker device (100), the vehicle device (200), and the central server (300) are activated.

The method begins with the processor of the worker device (100) determining if the data transceiver of the worker device (100) can detect a beacon signal from a beacon transmitter (FIG. 4: step 400). (The use of beacon transmitters to generate beacon signals is further described below). If the worker device (100) cannot detect a beacon signal (FIG. 4: step 400, "no"), then the processor worker device (100) determines if the satellite navigation signal receiver module can detect a satellite navigation signal (FIG. 4: step 406). If the worker device (100) cannot detect a satellite navigation signal (FIG. 4: step 406, "no"), then the worker device (100) continues to determine if it can detect a beacon signal (FIG. 4: step 400), or a satellite navigation signal (FIG. 4: step 406), until it can either positively detect a beacon signal (FIG. 4: step 400, "yes"), or positively detect a satellite navigation signal (FIG. 4: step 406, "yes"). In the embodiment shown in FIG. 4, the method prioritizes detection of beacon signals over detection of satellite navigation signals. In other embodiments, the method may prioritize detection of satellite navigation signals over detection of beacon signals. In still other embodiments, the method may attempt to detect beacon signals and satellite navigation signals, without prioritization, and use both types of signals in determining the position of the worker device (100) and the vehicle device (200). (Such an embodiment is described below with reference to FIG. 10.)

Suppose that the worker device (100) cannot detect a beacon signal (FIG. 4: step 400, "no"), but is in an environment (e.g., an outdoor environment) where the worker device (100) can detect a satellite navigation signal (e.g., a GPS signal) from orbiting satellites (508) of a satellite navigation system, as shown in FIG. 5 (FIG. 4: step 406, "yes"). Thus, the satellite navigation signal receiver module of the worker device (100) receives the satellite navigation system signals from the orbiting satellites (FIG. 4: step 408), and determines data indicative of one or a combination the worker device (100)'s location, speed, and direction based on the received satellite navigation signal (FIG. 4: step 410). For convenience, one or a combination of the location, speed, and direction of movement is hereinafter referred to as "kinematic data". The data transceiver of the central server (300) receives the worker device (100)'s kinematic data, transmitted by the data transceiver of the worker device (100), via a communications network (FIG. 4: step 412). As non-limiting examples, the communications network may include or a combination of a cellular network, a WiFi network, and a Terrestrial Trunked Radio (TETRA) network. It may be preferable for the communications network to include a pre-existing cellular network, in order to minimize the amount of specifically dedicated communications network infrastructure that needs to be installed for the system. It may be preferable for the data transmission to be secured from third party access. Accordingly, in one embodiment, the communications network between the central server (300) and the worker device (100) may include an encrypted virtual private network (VPN).

Figure 6:
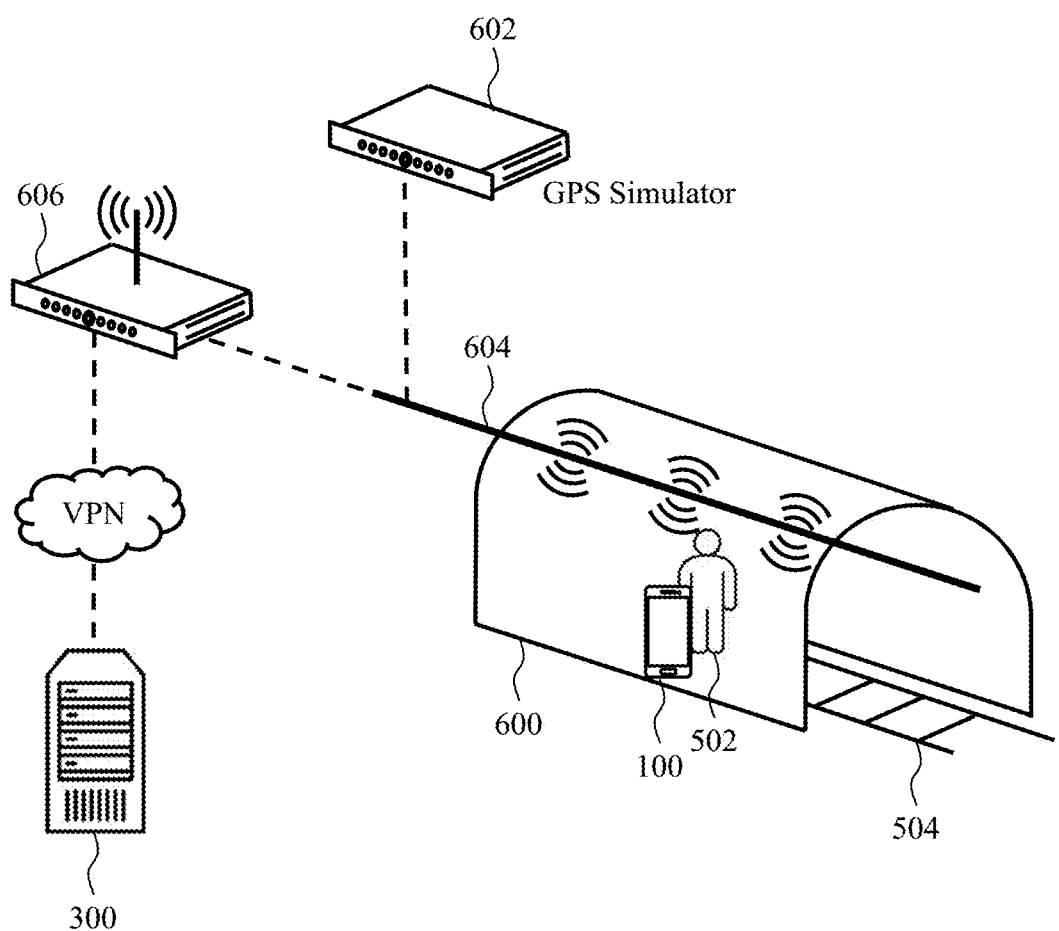
FIG. 6 shows a schematic depiction of an embodiment of a system of the present invention, including a GPS simulator.

In other environments, such as a tunnel (600) as shown in FIG. 6, the worker device (100) is not capable of receiving a satellite navigation signal from orbiting satellites. In such environments, the system may also include a satellite navigation signal simulator (602) (e.g., a GPS simulator) in communication with a leaky feeder (604) for radiating the simulated satellite navigation signals in the vicinity of the railway (504). For example, the leaky feeder (604) may be installed in segments of 500 m lengths in subway tunnel, above the railway or along the wayside of the railway. Thus, the data transceiver of the worker device (100) receives the satellite navigation system signals from the leaky feeder (604) (FIG. 4: step 406, "yes"), and the processor of the worker device (100) determines its kinematic data based on the received satellite navigation system signals (FIG. 4: step 408). The determination of the kinematic data may be performed by the worker device (100), in accordance with signal trilateration, as known to persons skilled in the art, or other suitable algorithms. The data transceiver of the central server (300) receives the worker device (100)'s kinematic data, transmitted by the data transceiver of the worker device (100), via a communications network (FIG. 4: step 410). In an environment such as a tunnel (600), the worker device (100) may not be capable of receiving cellular signals. Therefore, as a non-limiting example, the communications network includes the leaky feeder (604) in communication with a router (e.g., a cellular radio) (606), which is connected to a communications network (e.g., one or a combination of a cellular network, a Wi-Fi network, and a Terrestrial Trunked Radio (TETRA) network) that leads to the central server (300), as described above in respect to FIG. 5.

Figure 7:
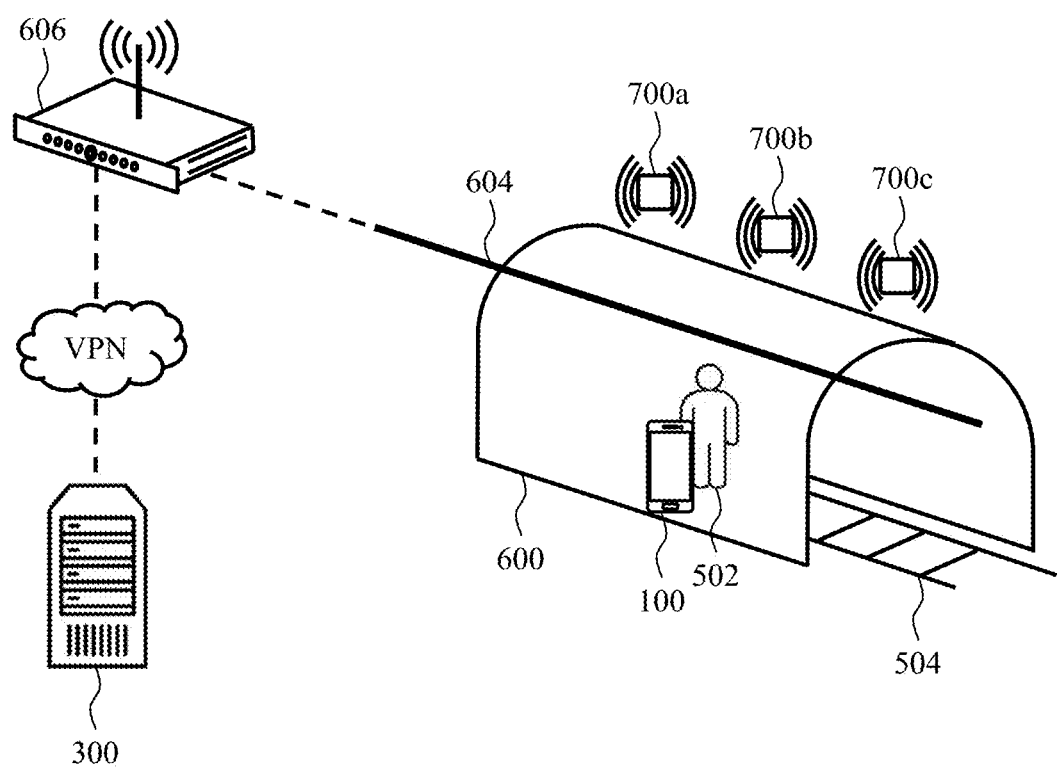
FIG. 7 shows a schematic depiction of an embodiment of a system of the present invention, also including Bluetooth beacons and a cellular radio.
Figure 8:
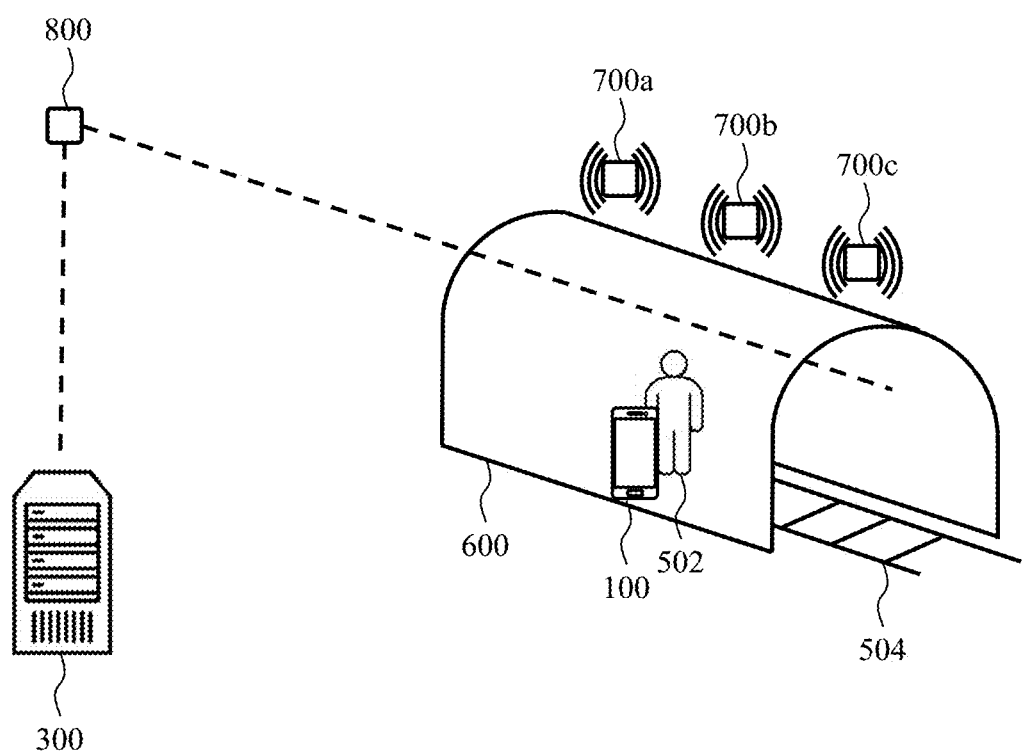
FIG. 8 shows a schematic depiction of an embodiment of a system of the present invention, also including Bluetooth beacons and a Bluetooth mesh access point.

As an alternative to the use of a satellite navigation signal simulator (602), the system as shown in FIGS. 7 and 8, may include beacon transmitters (700) for radiating beacon signals in the vicinity of the railway. As a non-limiting example, the beacon transmitters (700) may be Bluetooth beacon transmitters installed in the tunnel to radiate relatively low strength radio frequency beacon signals. In other embodiments, Beacon transmitters that transmit radio frequency signals in accordance with other protocols (e.g., Wi-Fi) are known and may be used. For example, the beacon signals may be installed above the railway (504) or along the wayside of the railway.

The data transceiver of the worker device (100) receives beacon signals (FIG. 4: step 400, "yes"). The received beacon signals include beacon signal data, either in the form of an actual position of the beacon transmitter (700), or in the form of an identifier uniquely associated with the beacon transmitter (700), which allows the position of the beacon transmitter (700a, 700b, 700c) to be determined through a relational table stored in a memory accessible to the central server (300). The processor of the worker device (100) also determines the strength or power of the received beacon signal (FIG. 4: step 402). The data transceiver of the central server (300) receives the beacon signal data, and the beacon signal strength or power data, transmitted by the data transceiver of the worker device (100), via a communications network (FIG. 4: step 408). As a non-limiting example, as shown in FIG. 7, the communication network may include a leaky feeder (604) in communication with a router (606), as described above in respect to FIG. 6, which is connected to a communications network (e.g., one or a combination of a cellular network, a Wi-Fi network, and a Terrestrial Trunked Radio (TETRA) network) that leads to the central server (300), as described above in respect to FIG. 5. As another non-limiting example, as shown in FIG. 8, the communication network may include a router for a wireless access point (800) (e.g., a Bluetooth mesh access point).

The processor of the central server (300) processes the beacon signal data, and the beacon signal strength or power data to determine the location of the worker device (100) (FIG. 4: step 404). As noted, the beacon signal data may indicate the position of the beacon transmitter that transmitted the beacon signal. Alternatively, the beacon signal data may include an identifier uniquely associated with the beacon transmitter, which allows the central server (300) to determine the position of the beacon transmitter through a relational table stored in a memory of the central server (300). The central server (300) uses the beacon signal strength data to determine the distance of the worker device (100) from the beacon transmitter (700) in accordance with a quantitative relationship of distance, to received signal strength, and transmitted signal strength. As used herein, "received signal strength" refers to the strength of the signal (e.g., as measured in power units) as received by the data transceiver of the worker device (100), after any attenuation and/or interference phenomena from the beacon transmitter (700) to the worker device (100). In contrast, the "transmitted signal strength" refers to the strength of the signal (e.g., as measured in power units) radiated by the antenna of the beacon transmitter. Such quantitative relationships as are known to persons skilled in the art of signal transmission, and do not by themselves constitute part of the present invention. As a non-limiting example, the relationship between distance (d), received signal strength expressed as field strength (E), and transmitted signal strength in terms of power (P) can be theoretically determined by a quantitative relationship of the form expressed in the form: $d \alpha \sqrt{P}/E$.

The transmitted signal strength of the beacon transmitter (700) may be part of the beacon signal data. In this embodiment, the transmitted signal strength may either be an actual transmitted signal strength as measured by a processor associated with the beacon transmitter (700), or a nominal transmitted signal strength that is expected based on specifications of the beacon transmitter (700). Alternatively, the beacon signal data may include an identifier uniquely associated with the beacon transmitter (700), which allows the central server (300) to determine the transmitted signal strength of the beacon transmitter (700) through a relational table stored in a memory of the central server (300). In this embodiment, the transmitted signal strength may be a nominal transmitted signal strength that is expected based on specifications of the beacon transmitter (700). In either case, the central server (300) may use the beacon transmitter position and the determined distance of the worker device (100) from the beacon transmitter (700) to determine a position of the worker device (100). For example, the central server (300) may determine the distance of the worker device (100) from three beacon transmitters associated with the strongest received signal strengths at the worker device (100). The central server (300) may then determine the position of the worker device (100) by signal trilateration, as known to persons skilled in the art.

It will be apparent that the processor of the central server (300) may further determine the speed and direction of movement of the worker device (100) by determining its position at successive times, either at known time intervals, or at times measured by a computer clock, and using quantitative relationships relating direction of movement to positional change, and relating speed to positional change over time, as are known in the art of kinematics.

The above description of the determination of the kinematic data for the worker device (100) applies in an analogous manner to the determination of the kinematic data for the vehicle device (200). Hence the steps in FIG. 4 described in respect to the "worker/vehicle device" indicate that the steps may apply equally to the worker device (100) and the vehicle device (200). At any particular instance in time, the type of received signal used for determining kinematic data of the worker device (100) may be either the same as or different than the type of received signal used for determining the kinematic data of the vehicle device (200). For example, satellite navigation signals received from orbiting satellites may be used to determine the kinematic data of the vehicle device (200) while the rail vehicle is located outdoors (as shown in FIG. 5), while satellite navigation signals received from a satellite navigation signal simulator (as shown in FIG. 6) or beacon signals received from beacon transmitters (as shown in FIG. 7 or 8) may be used to determine the kinematic data of the worker device (100) while the worker device (100) is simultaneously located in a tunnel (600), or vice versa.

The method continues with the processor of the central server (300) determining a safety metric based on one or a combination of the worker device (100)'s kinematic data, and the vehicle device (200)'s kinematic data (FIG. 4: step 412). The safety metric may be the kinematic data itself— i.e., the position, speed, or direction of movement of the worker device (100), or the vehicle device (200), as the case may be. Alternatively, the safety metric may be derived using a quantitative relationship between two or more parameters of one or a combination of the worker device (100)'s kinematic data, or the vehicle device (200)'s kinematic data, which quantitative relationship is stored in the memory of the central server (300). As a non-limiting example, the safety metric may be the distance between the worker device (100) and vehicle device (200), along the path of the railway (504), a geometric description of which may be stored in the memory of the central server (300). As another non-limiting example, the safety metric may be an estimated time of arrival for the vehicle device (200) at the worker device (100), along the path of the railway (504). A user of the central server (300) may configure other safety metrics stored in the memory of the central server (300), without having to modify the worker device (100) or the vehicle device (200).

The method continues with the processor of the central server (300) determining if the safety metric violates a predetermined safety rule, which safety rule is stored in the memory of the central server (300) (FIG. 4: step 414). As a non-limiting example, the central server (300) may determine if the position of the worker device (100) is outside of a predetermined safe working zone, a geometric description of which may be stored in the memory of the central server (300). As a non-limiting example, the central server (300) may determine if the speed of the rail vehicle is greater than a predetermined value, which may be indicative of a loss of control of the rail vehicle. As a non-limiting example, the central server (300) may determine if the distance between the worker device (100) and the vehicle device (200), or the estimated time of arrival for the vehicle device (200) at the worker device (100), along the railway (504) is less than a predetermined value, indicating that the worker is too close to the rail vehicle. A user of the central server (300) may configure other safety rules stored in the memory of the central server (300), without having to modify the worker device (100) or the vehicle device (200).

If the central server (300) determines that the safety rule is violated, then the method continues with the processor of the central server (300) causing the data transceiver of the central server (300) sending notification data via a communications network (FIG. 4: step 416). The notification data may be sent to one or a combination of the worker device (100), the vehicle device (200), and another device used by a person other than the worker or the operator of the rail vehicle, such as an administrator of a rail transit system. As a non-limiting example, the notification data may encode one or a combination of graphical information or audio information (e.g., a graphical, text-based, or audio warning message or alarm), or a haptic alarm (e.g., a series of vibrations), associated with the violation of the safety rule. A user of the central server (300) may configure the notification data differently for violation of different safety rules, without having to modify the worker device (100) or the vehicle device (200). For example, different warning messages may be associated with violation of different safety rules. A user of the central server (300) may configure the selection of devices (100 and/or 200) that receive the notification data differently for violation of different safety rules, without having to modify the worker device (100) or the vehicle device (200). For example, notification data may be sent to only a worker device (100) for violation of some safety rules, while notification data may be sent to both the worker device (100) and the vehicle device (200) for violation of other safety rules.

The method continues with the data transceiver of one or a combination of the worker device (100), the vehicle device (200), and another device, receiving the notification data. In response, the processor of the device(s) causes the output device(s) of the device(s) to generate one or a combination of a visual, audible, or haptic warning of the safety rule violation (FIG. 4: step 418). As a non-limiting example, the display device of the worker device (100) may display a graphical or text-based warning message or alarm, the electro-acoustic transducer of the worker device (100) may emit an audio warning message or alarm, and the vibrator of the worker device (100) may vibrate, to alert the worker of the safety rule violation, so that the worker can take remedial action.

Method for determining position of a worker device or vehicle device based on multiple signals.

As noted above, determining the position of workers or rail vehicles based on a single signal can result in significant, transient, and unpredictable inaccuracies. To address this problem, the present invention provides a method for determining the position of a worker device (100) or a vehicle device (200) based on multiple signal sources, which may the same or different in type. Such multiple signals may include beacon signals, a satellite navigation signal, or a combination of beacon signals and satellite navigation signals.

Figure 9:
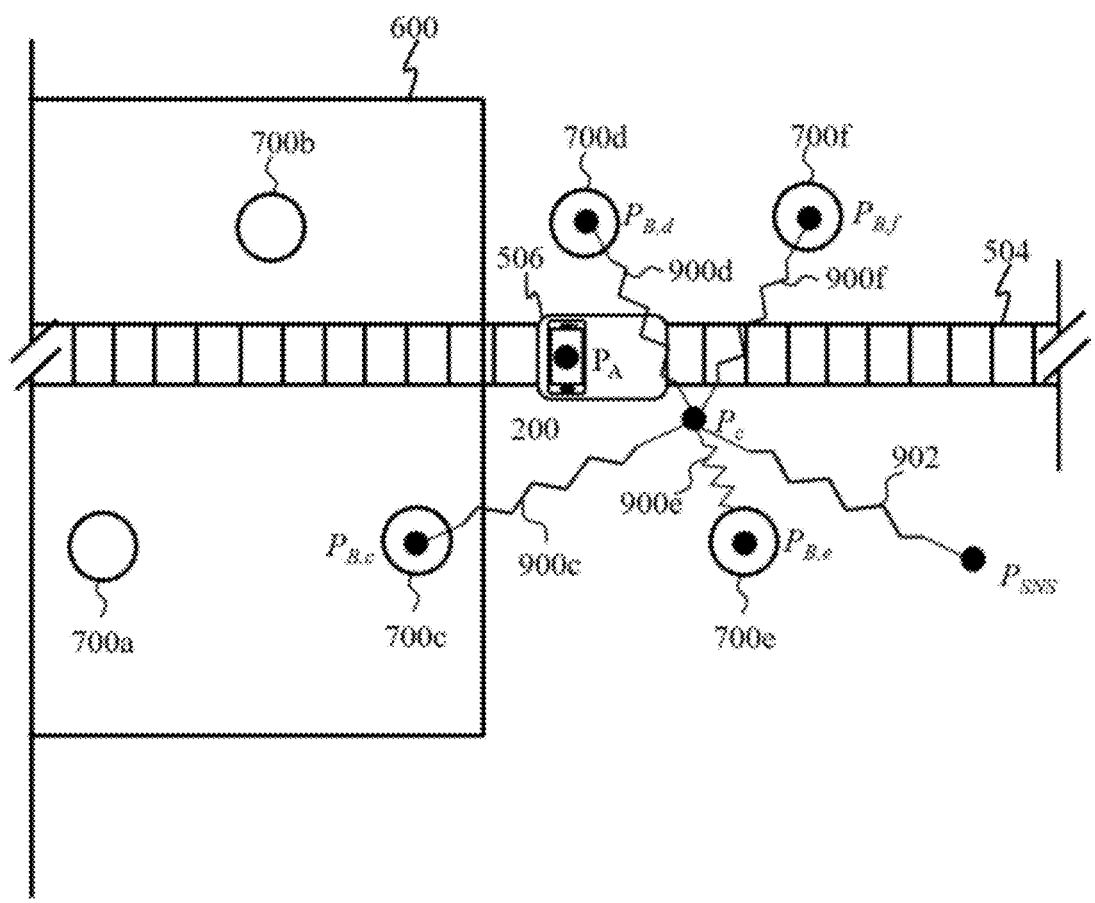
FIG. 9 shows a schematic depiction of an embodiment of a system of the present invention, for determining the position of a rail vehicle using multiple beacon signals, and a satellite navigation signal.

FIG. 9 shows a schematic depiction of a system of the present invention, as used to determine the position of vehicle device (200), using multiple beacon signals and a satellite navigation signal (SNS). In this example, the device in question is a vehicle device (200) onboard rail vehicle (506) moving along the railway (504), shortly after exiting the tunnel (600). However, it will be understood that the method may be applied in an analogous manner to determine the position of a worker device (100) carried by a worker. In this example, the system includes six Bluetooth beacon transmitters (700a to 700f). Some beacon transmitters (700a to 700b) are "non-reporting" in the sense that their beacon signals are out of reception range of the data transceiver of the asset, and therefore not useful in determining the position of the vehicle device (200). Other beacon transmitters (700c to 700f) are "reporting" in the sense that their beacon signals are within reception range of the vehicle device (200), and therefore are used in determining the position of the vehicle device (200). When the rail vehicle (506) emerges from the tunnel (600), and the onboard satellite navigation signal (SNS) receiver module of the vehicle device (200) re-establishes connection with SNS, the position of the vehicle device (200) determined using SNS signals may be relatively inaccurate, compared to its position determined using signals from the beacon transmitters (700c to 700f). Moreover, beacon signals from beacon transmitter (700e) that is relatively proximal to the vehicle device (200) may allow for more reliable and accurate determination of the position of the vehicle device (200), in comparison to beacon signals from beacon transmitter (700c) that is relatively distal from the vehicle device (200). The method of the present invention attempts to address such problems by processing all the signals in a rational manner, having regard to factors including their received strength or power.

In FIG. 9, the position of each beacon transmitter, $P_{B,i}$, is presumed to be known. The nominal "i" indicates the beacon transmitter in question amongst "n" number of reporting beacon transmitters. Thus, the positions of beacon transmitters (700c, 700d, 700e, 700f) are denoted as by $P_{B,c}$, $P_{B,d}$, $P_{B,e}$, and $P_{B,f}$, respectively. The actual position of the vehicle device (200) is denoted by the position $P_A$. The position of the vehicle device (200) as calculated by the method of the present invention is denoted by the position $P_C$. The position of the vehicle device (200) as determined using a SNS signal is denoted by the position $P_{SNS}$. As an example, the SNS signal may be a GPS signal, and the position $P_{SNS}$ may be determined by the GPS receiver module of the vehicle device (200) as known in the art. The foregoing positions may be expressed in vector form with two or three-dimensional coordinates. FIG. 9 also shows notional linear springs (900c to 900f, and 902) acting in the direction between positions $P_C$ and $P_{B,i}$, for each beacon transmitter, and in the direction from position $P_C$ to position $P_{SNS}$. It will be understood that the springs are notional, and do not physically exist.

Figure 10:
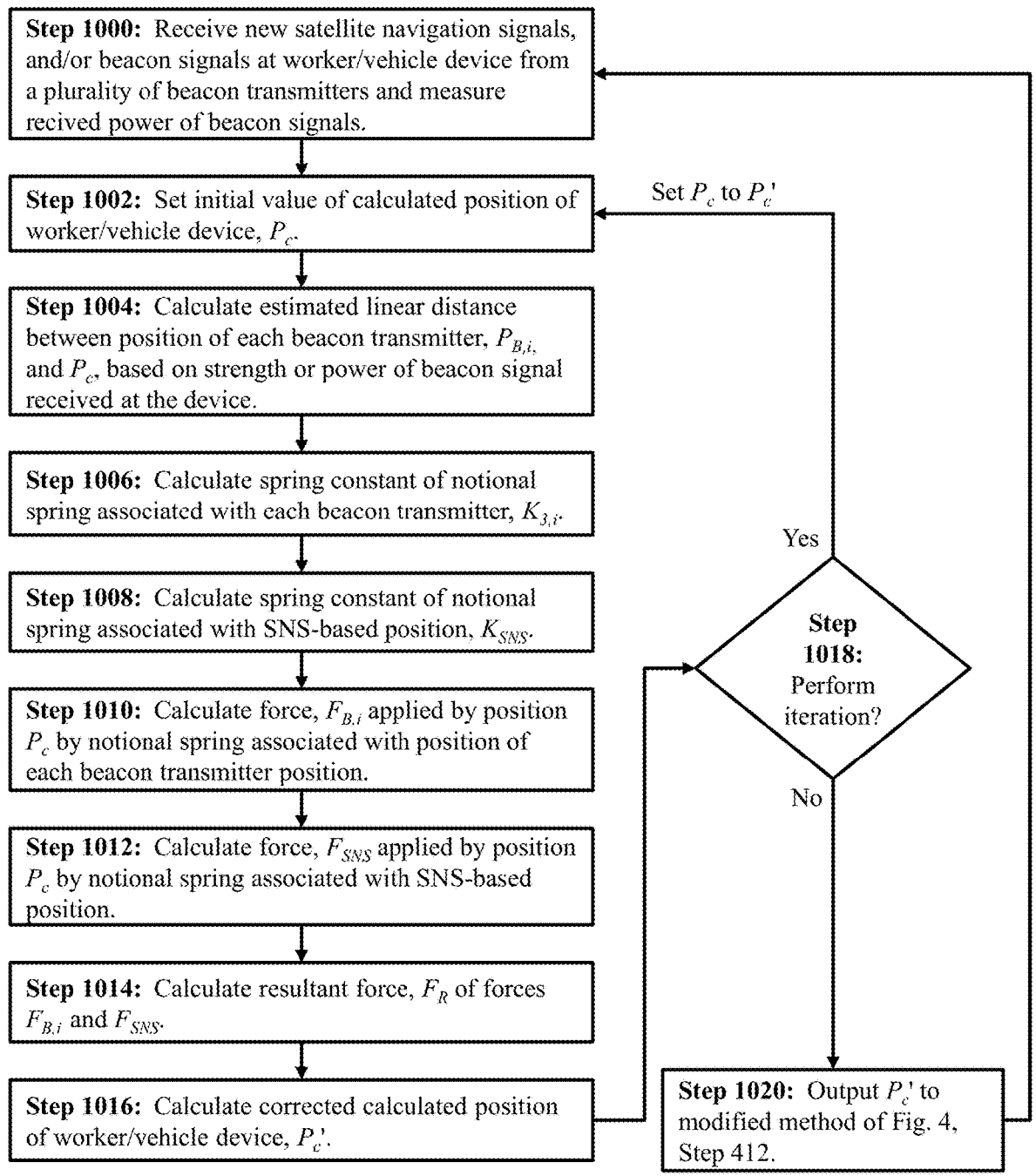
FIG. 10 shows a flow chart of an embodiment of a method of the present invention, for determining the position of a device using multiple beacon signals, and a satellite navigation signal.

FIG. 10 shows a flow chart of example of a method of the present invention, for determining the position of a worker device (100) or a vehicle device (200) using multiple beacon signals and a satellite navigation signal. In FIG. 10, the steps described in respect to the "worker/vehicle device" indicate that the steps may apply equally to the worker device (100) and the vehicle device (200). The method is implemented by the processor component of the vehicle device (200), or the processor of the central server (300), or both of them in combination. The use of processor(s) is essential to implementing the method to allow for timely communication and processing of beacon signal and satellite navigation signals, and for determination of the vehicle device (200) in a real-time or near real-time manner, as needed for a practical safety system.

The method is initiated by the first step of receiving new beacon signals, and/or a satellite navigations signal at a given instance of time (FIG. 10: step 1000).

The next step (FIG. 10: step 1002) is to set the calculated position $P_C$ of the vehicle device (200), The method may be performed for a signals received at a first time, and performed again for a set of signals received at a subsequent second time. Accordingly, at the second time, the calculated position $P_C$ of the vehicle device (200), may be set as the corrected calculated position $P_C'$ of the vehicle device (200), as determined at step 1016 based on processing of the signals received at the first time. Alternatively, it is possible to set the position $P_C$ to an arbitrary position, or as the satellite navigation signal-based position.

The next step (FIG. 10: step 1004) is to calculate the estimated linear distance, $D_{1,i}$, between each of positions $P_{B,i}$, and position $P_C$, based on the measured power of the beacon signal of the beacon transmitter as received at the vehicle device (200). In one embodiment, $D_{1,i}$, is calculated based on measure power of the beacon signals from each beacon transmitter, in accordance with the following equation.

$$D_{1,i} = 10^{\left(\frac{K_{1,i} - RSSI_i}{10 \times K_{2,i}}\right)} \quad \text{(Eqn. 1)}$$

In Eqn. 1, the parameter, $RSSI_i$ (received signal strength indication) is a measurement of the power present in the beacon signal as received by the vehicle device (200). The concept of received signal strength indication, and its measurement using device such as wireless networking cards, are known to persons skilled in the art. The parameter $K_{1,i}$ is a constant indicative of the signal strength of the beacon transmitter at a specified distance from the beacon transmitter. For example, $K_{1,i}$ may be the power present in the received beacon signal measured at a distance of one meter from the beacon transmitter. The parameter $K_{2,i}$, is a constant indicative of the decrease of signal strength with distance from the beacon transmitter. For example, the person of ordinary skill in the art may determine the value of the parameter, $K_{2,i}$, through a calibration exercise involving the measurement of the RSSI value at a known distance (e.g., 10 meters) from the beacon transmitter. In other embodiments, other quantitative relationships between $D_{1,i}$ and RSSI, or other measures of beacon signal strength or power, may be used.

Figure 11:
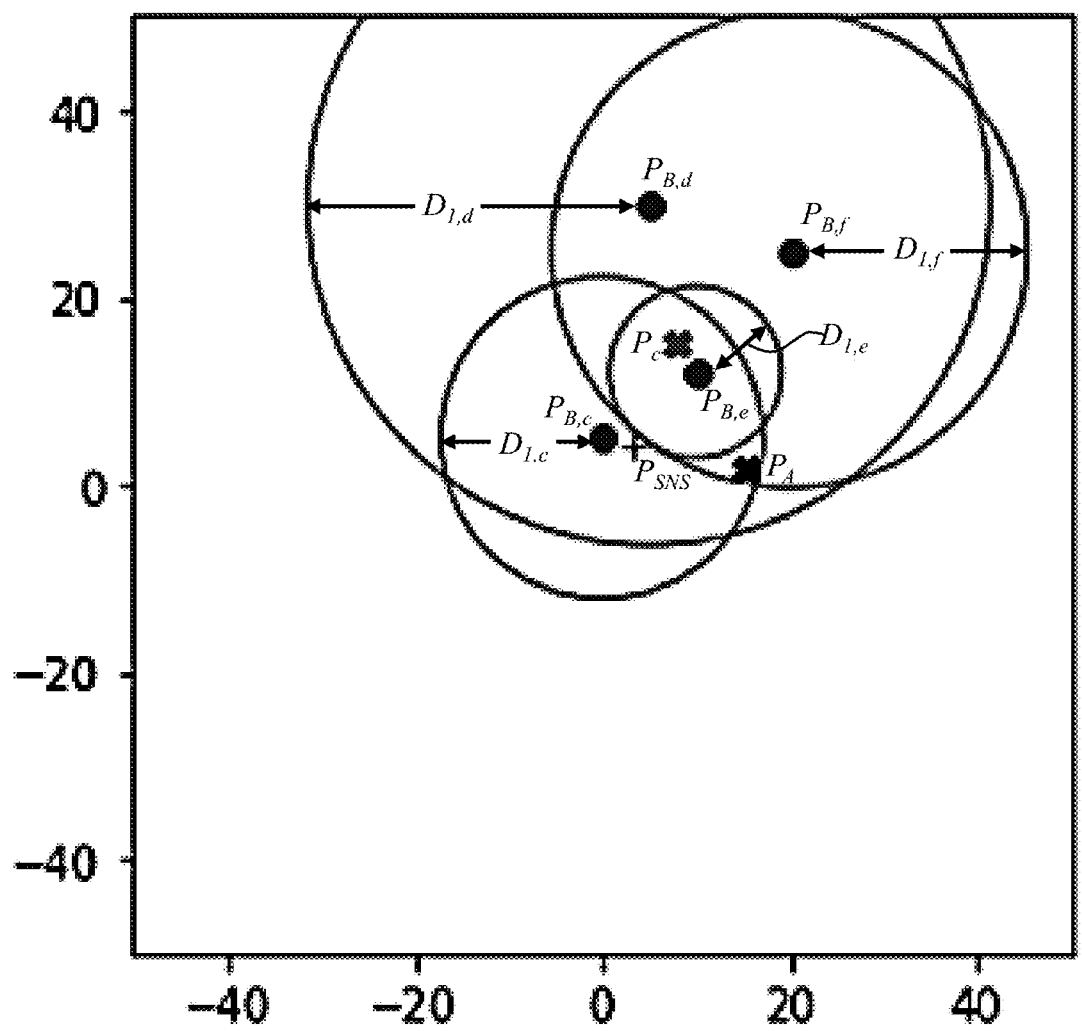
FIG. 11 shows an example of a plot of the actual position ($P_A$) of a vehicle device, the positions of beacon transmitters ($P_B$), the calculated position ($P_C$) of the vehicle device, and a satellite navigation signal-based location of the vehicle device ($P_{SNS}$) to illustrate an aspect of the method of FIG. 10.

FIG. 11 shows a plot of the positions $P_{B,c}$ to $P_{B,f}$ of the beacon transmitters (700c to 700f) respectively, the actual position $P_A$ of the vehicle device (200), the SNS-based position $P_{SNS}$ of the vehicle device (200), and the calculated position $P_C$ of the vehicle device (200). For each beacon transmitter, the plot shows a circle centered at the position of beacon transmitter $P_{B,i}$, with a radius equal to the value of $D_{1,i}$. In FIG. 11, the values of $D_{1,i}$ for beacon transmitters (700c to 700f) are labelled as $D_{1,c}$ to $D_{1,f}$ respectively. In ideal circumstances, the values of $D_{1,c}$ to $D_{1,f}$ would result in the four circles intersecting at a single point, which uniquely determines the position $P_c$. In reality, however, the values of $D_{1,c}$ to $D_{1,f}$ may result in the four circles intersecting at multiple points, such that the correct value of the position $P_C$ cannot be determined merely by the geometry of $P_{B,c}$ to $P_{B,f}$ and $D_{1,c}$ to $D_{1,f}$.

The next step (FIG. 10: step 1006) is to calculate the spring constant, $K_{3,i}$, of the notional spring associated with each beacon transmitter. In one embodiment, $K_3$ may be calculated be determined for each beacon transmitter as follows.

$$K_{3,i} = \frac{1}{2}(rk_{1,i} + rk_{2,i}) \quad \text{(Eqn. 2)}$$

In other embodiments, other quantitative relationships may be used to determine the notional spring constant. For example, the spring constant may be based solely on rk1 or rk2, rather than an average of them as shown in Eqn. 2.

In Eqn. 2, the parameter $rk_{1,i}$, accounts for the amount of time elapsed since last "reporting" of the beacon signal. The processor implementing the invention may comprise a computer clock for determining this elapsed time. It will be understood that the present method may be performed on a continuing repeated basis. Therefore, a greater amount of time elapsed since the signal "reported," tends to indicate that the asset has just moved into range of that beacon signal, and that beacon signal may therefore be considered less relevant to calculating the position of the vehicle device (200), in comparison with a signal that has more recently reported. Therefore, the parameter $rk_1$ may be determined in accordance with a quantitative relationship that negatively correlates its value to the elapsed time since the beacon transmitter last reported. In one embodiment, $rk_{1,i}$, is determined in accordance with the following equation, where $t_i$ is the elapsed time since the beacon transmitter last reported.

$$rk_{1,i} = \frac{1}{t_i^3} \quad \text{(Eqn. 3)}$$

In other embodiments, other quantitative relationships that negatively correlate the parameters $rk_{1,i}$, and $t_i$ may be used.

The parameter $rk_{2,i}$ accounts for the distance between the beacon transmitter and the vehicle device (200). A greater distance between the beacon transmitter and the vehicle device (200) tends to degrade the beacon signal, and the signal may therefore be considered less relevant to calculating the position of the vehicle device (200), in comparison with a signal from a closer beacon transmitter. The parameter $rk_{2,i}$ may be determined in accordance with a quantitative relationship that negatively correlates its value to the distance between the beacon transmitter and the vehicle device (200). In one embodiment, $rk_{2,i}$ is determined in accordance with the following equation.

$$rk_{2,i} = \frac{10\,A}{\log_{10}(D_{1,i})} \quad \text{(Eqn. 4)}$$

In Eqn. 4, the parameter, A, is a constant, which may be determined by calibration, and $D_{1,i}$ is the estimated linear distance as calculated by Eqn. 1. In other embodiments, other quantitative relationships that negatively correlate the parameters $rk_2$ and $D_{1,i}$ may be used.

The next step (FIG. 10: step 1008) is to calculate the spring constant, $K_{SNS}$, of the notional spring associated with the SNS-based position $P_{SNS}$ of the vehicle device (200). In one embodiment, $K_{SNS}$ may be calculated be determined as follows.

$$K_{SNS} = \frac{1}{2}(rk_{1,SNS} + rk_{2,SNS}) \quad \text{(Eqn. 5)}$$

In other embodiments, other quantitative relationships may be used to determine the notional spring constant. For example, the spring constant may be based solely on $rk_{1,SNS}$ or $rk_{2,SNS}$, rather than an average of them as shown in Eqn. 5.

In Eqn. 5, the parameter $rk_{1,SNS}$ accounts for the amount of time elapsed since last "reporting" of the SNS signal. Therefore, the parameter $rk_{1,SNS}$ may be determined in accordance with a quantitative relationship that negatively correlates its value to the elapsed time since the SNS signal last reported. In one embodiment, $rk_{1,SNS}$ is determined in accordance with the following equation, where $t_{SNS}$ is the elapsed time since the SNS signal last reported.

$$rk_{1,SNS} = \frac{1}{t_{SNS}^3} \quad \text{(Eqn. 6)}$$

The parameter $rk_{2,SNS}$ accounts for the accuracy of the SNS-based position. As the SNS-based position becomes less accurate, it may be considered less relevant. The parameter $rk_{2,SNS}$ may be determined in accordance with a quantitative relationship that negatively correlates its value to the accuracy of the SNS-based position. In one embodiment, $rk_{2,SNS}$ is determined in accordance with the following equation.

$$rk_{2,SNS} = \frac{B}{\log_{10}(\text{SNS\_accuracy})} \quad \text{(Eqn. 7)}$$

In Eqn. 7, the parameter, B, is a constant, which may be determined by calibration. The parameter SNS_accuracy is a constant indicative of the SNS-based position accuracy expressed as a distance, with a larger value indicating lower accuracy. For example, for a typical GPS-based position, a value for SNS_accuracy may be about 5 meters.

Figure 12:
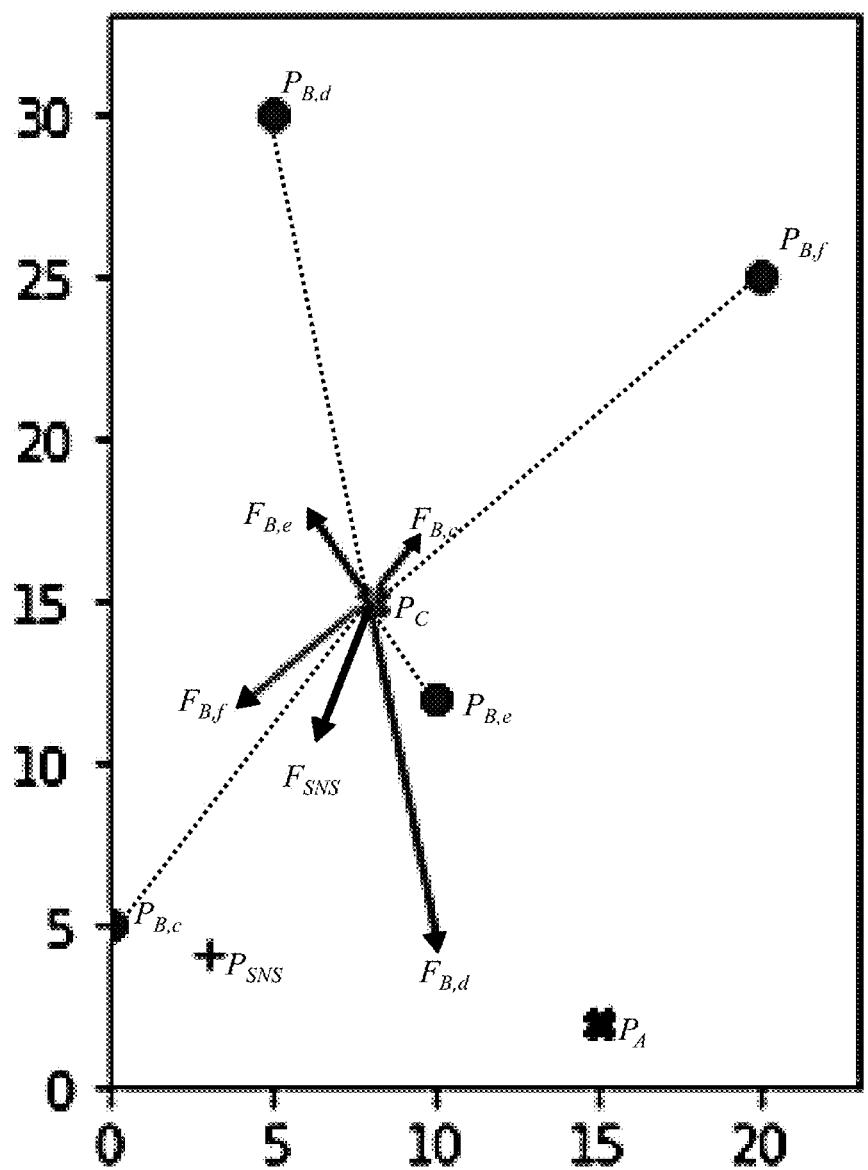
FIG. 12 shows an example of a vector diagram of notional spring forces exerted by the positions of beacon transmitters ($P_B$) and by a satellite navigation signal-based position ($P_{SNS}$) on a the calculated position ($P_c$) of the vehicle device, to illustrate an aspect of the method of FIG. 10.

FIG. 12 shows a plot of the notional spring forces, $F_{B,c}$ to $F_{B,f}$ exerted by positions $P_{B,c}$ to $P_{B,f}$ respectively, on position $P_C$, and the notional spring force $F_{SNS}$ exerted by position $P_{SNS}$, on position $P_C$.

The next step (FIG. 10: step 1010) is to calculate the force vector $F_{B,i}$ applied to position $P_C$ by each notional linear elastic spring extending from position $P_C$ to position $P_{B,i}$. In one embodiment, $F_{B,i}$ may be calculated in accordance with the following equation.

$$F_{B,i} = K_{3,i} \times (D_{2,i} - D_{1,i}) \times u_{B,i} \quad \text{(Eqn. 8)}$$

In Eqn. 8, the parameter, $K_{3,i}$, is a notional spring constant as calculated by Eqns. 2 to 4, above. The parameter $D_{2,i}$ is the linear distance between position $P_{B,i}$ and position $P_C$, as determined geometrically. The parameter $D_{1,i}$, is the estimated linear distance between position $P_{B,i}$ and position $P_C$, based on the received beacon signal power, as calculated in accordance with Eqn. 1. The parameter $u_{b,i}$ is the unit vector in the direction from position $P_C$ to position $P_{B,i}$. The direction of $F_{B,i}$ is determined by the sign of scalar value $(D_{2,i}-D_{1,i})$. $F_{B,i}$ and $u_{b,I}$ will be in the same direction towards position $P_{B,I}$, when position $P_c$ is outside the circle of radius $D_{1,i}$ centered about position $P_{B,i}$. In that case, the notional spring corrects position $P_c$ by "pulling" it towards position $P_{B,i}$. Conversely, $F_{B,i}$ will be in the direction towards position $P_c$ when position $P_c$ is inside the circle of radius $D_{i,i}$ centered about position $P_{B,i}$. In that case, the notional spring corrects position $P_c$ by "pushing" it away from position $P_{B,i}$.

The next step (FIG. 10: step 1012) is to calculate the force vector $F_{SNS}$ applied to position $P_C$ by the notional linear elastic spring extending from position $P_C$ to position $P_{SNS}$. In one embodiment, $F_{SNS}$ may be calculated in accordance with the following equation.

$$F_{SNS} = K_{SNS} \times D_{SNS} \times u_{SNS} \quad \text{(Eqn. 9)}$$

In Eqn. 9, the parameter, $K_{SNS}$, is a notional spring constant as calculated by Eqns. 5 to 7, above. The parameter $D_{SNS}$ is the linear distance between position $P_{SNS}$ and position $P_C$, as determined geometrically. The parameter $u_{SNS}$ is the unit vector in the direction from position $P_C$ to position $P_{SNS}$. Since the scalar value $D_{SNS}$ is positive, $F_{SNS}$ will be in the same direction as $u_{SNS}$. Thus notional spring corrects position $P_c$ by "pulling" it towards position $P_{SNS}$.

The next step (FIG. 10: step 1014) is to calculate the resultant force vector, $F_R$, of each of the force vectors, $F_{B,i}$ and $F_{SNS}$. In one embodiment, $F_R$ may be calculated in accordance with the following equation, where the parameter n is the number of beacon transmitters that are reporting.

$$F_R = \sum_{i=1}^{n} F_{B,i} + F_{GPS} \quad \text{(Eqn. 10)}$$

The next step (FIG. 10: step 1016) is to calculate a corrected calculated position of the vehicle device (200), $P_c'$, based on the calculated position of the vehicle device (200), $P_c$, and the resultant force vector, $F_R$. In one embodiment, $P_c'$, may be calculated in accordance with the following equation.

$$P_c' = P_c + C \times F_R \quad \text{(Eqn. 11)}$$

In Eqn. 11, the parameter, C, is a constant that acts as a scaling factor. Hence the position $P_c$ is corrected by a distance that is proportional to the magnitude of the force $F_R$. For example, the person skilled in the art may select the value of C by trial-and-error with a view to optimizing computation efficiency and convergence of results over multiple iterations as discussed below.

The next step (FIG. 10: step 1018) is to determine whether to perform an additional iteration of the method. The number of iterations may be controlled by a specified maximum number of iterations, or satisfaction of a convergence criteria, or both. As non-limiting examples, the convergence criteria may be the resultant force vector, $F_R$, having a magnitude below a threshold value, or the distance between $P_c$ and $P_c'$ being less than a threshold value. If it is determined to perform another iteration, then method returns to step 1002, setting the position $P_c$ to the position of $P_c'$ as calculated in the step 1016.

Figure 13:
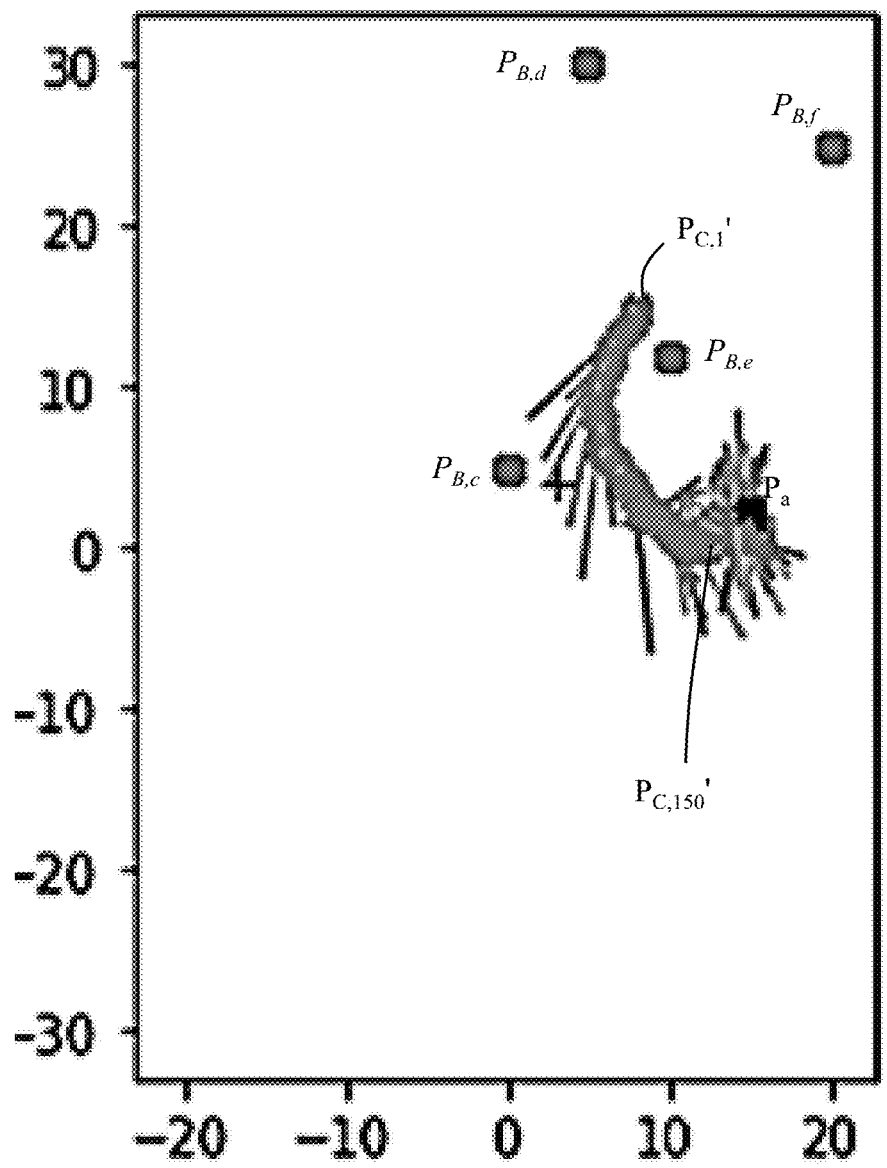
FIG. 13 shows an example of a plot of the actual position ($P_A$) of a vehicle device, and the corrected calculated position ($P_c'$) of the vehicle device over multiple iterations of the method of FIG. 10.

FIG. 13 shows an example plot of the corrected calculated position $P_c'$ as determined over 150 iterations. In this example, the position of $P_c'$ traces an arc-like curve from $P_{c,1}'$ at iteration no. 1, to $P_{c,150}'$ at iteration no. 150. Ideally, the position $P_c'$ should approach the actual location, $P_a$, of the vehicle device (200). FIG. 13 also shows the resultant force vectors at different iterations, plotted at the corresponding position $P_c'$. As $P_c'$ converges, the magnitude of the resultant force vectors tends to decreases.

If it is determined to not perform additional iterations, then the next step (FIG. 10: step 1020) is to output the position of $P_c'$ as the position of the vehicle device (200). For example, the position $P_c'$ may be output step to 412 in a modified version of the method shown in FIG. 4, where the kinematic data of the vehicle device (200) is determined using both beacon signals and SNS signals, rather than exclusively one of the foregoing types of signals. This information may then be used to generate notifications of safety rule warnings as described in accordance with the remainder of the method of FIG. 4.

The method then returns to step (1000), to await the receipt of new satellite navigation signals and/or beacon signals at a future time. Upon doing so, the method proceeds to repeat steps 1002 to 1020.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of 5%, +10%, 20%, or 25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A method for determining a position of a worker or a rail vehicle, the method comprising the steps of:
   (a) providing a device adapted to be either carried by the worker or placed onboard the rail vehicle, the device comprising a receiver for receiving a beacon signal from each of a plurality of beacon transmitters; and
   (b) receiving at the device a beacon signal from each of a plurality of beacon transmitters;
   using at least one processor, performing the further steps of:
   (c) for each one of the beacon transmitters:
      (i) determining a power level of the beacon signal as received at the device from the one of the beacon transmitters;
      (ii) calculating an estimated distance, $D_1$, between the beacon transmitter and an initial value for a calculated position of the device based on the power level of the beacon signal received from the beacon transmitter;
      (iii) calculating a distance, $D_2$, between the beacon transmitter and the initial value for the calculated position of the device;
      (iv) calculating a correction, $\Delta_B$, to the initial value of the calculated position of the device, based on a quantitative relationship in the form $\Delta_B = K_3 \times (D_2 - D_1)$, wherein $K_B$ is a constant based on a quantitative relationship that negatively correlates $K_B$ to at least one or both of:
         (A) the measured power level of the beacon signal received from the beacon transmitter; and
         (B) an elapsed time since a previous beacon signal was last received by the device from the beacon transmitter;
   (d) calculating a corrected calculated position of the device based on the initial value of the calculated position of the device and the corrections, $\Delta_B$; and
   (e) outputting the corrected calculated position of the device as the position of the device.

2. The method of claim 1, wherein the constant, $K_3$, is based on the quantitative relationship that negatively correlates $K_3$ to the measured power level of the beacon signal received from the beacon transmitter.

3. The method of claim 1, wherein the constant, $K_3$, is based on the quantitative relationship that negatively correlates $K_3$ to the elapsed time since the previous beacon signal was last received by the device from the beacon transmitter.

4. The method of claim 1, wherein the method comprises the further steps of:
   (a) receiving at the device a satellite navigation signal, and determining a position of the device based on the satellite navigation signal;
   (b) using the at least one processor, calculating a distance, $D_{SNS}$, between the position of the device based on the satellite navigation signal and the initial value for the calculated position of the device; and
   (c) using the at least one processor, calculating a correction, $\Delta_{SNS}$, to the calculated position of the device, based on a quantitative relationship $\Delta_{SNS} = K_{SNS} \times D_{SNS}$, wherein $K_{SNS}$ is a constant based on a quantitative relationship that negatively correlates $K_{SNS}$ to at least one or both of:
      (i) an elapsed time since a previous satellite navigation signal was received by the device; and
      (ii) an accuracy of the position of the device based on the satellite navigation signal; and
   wherein the step of calculating the corrected calculated position of the device is further based on the correction, $\Delta_{SNS}$.

5. The method of claim 4, wherein the constant $K_{SNS}$ is based on the quantitative relationship that negatively correlates $K_{SNS}$ to the elapsed time since the previous satellite navigation signal was received by the device.

6. The method of claim 4, wherein the constant $K_{SNS}$ is based on the quantitative relationship that negatively correlates $K_{SNS}$ to the accuracy of the position of the device based on the satellite navigation signal.

7. A system for determining a position of either a worker or a rail vehicle, the system comprising:
   (a) a device adapted to be either carried by the worker or placed onboard the rail vehicle, the device comprising a receiver for receiving a beacon signal from each of a plurality of beacon transmitters; and
   (b) at least one processor in communication with the receiver of the device, and operatively connected to a non-transient computer readable medium storing instructions executable by the processor to implement a method comprising the steps of:
      (i) for each one of the beacon transmitters:
         (A) determining a power level of the beacon signal as received at the device from the one of the beacon transmitters;
         (B) calculating an estimated distance, $D_1$, between the beacon transmitter and an initial value for a calculated position of the device based on the power level of the beacon signal received from the beacon transmitter;
         (C) calculating a distance, $D_2$, between the beacon transmitter and the initial value for the calculated position of the device;
         (D) calculating a correction, $\Delta_B$, to the initial value of the calculated position of the device, based on a quantitative relationship in the form $\Delta_B = K_3 \times (D_2 - D_1)$, wherein $K_B$ is a constant based on a quantitative relationship that negatively correlates $K_B$ to at least one or both of:
            (1) the measured power level of the beacon signal received from the beacon transmitter; and
            (2) an elapsed time since a previous beacon signal was last received by the device from the beacon transmitter;
      (ii) calculating a corrected calculated position of the device based on the initial value of the calculated position of the device and the corrections, $\Delta_B$; and (iii) outputting the corrected calculated position of the device as the position of the worker or the rail vehicle.

8. The system of claim 7, wherein the constant, $K_3$, is based on the quantitative relationship that negatively correlates $K_3$ to the measured power level of the beacon signal received from the beacon transmitter.

9. The system of claim 7, wherein the constant, $K_3$, is based on the quantitative relationship that negatively correlates $K_3$ to the elapsed time since the previous beacon signal was last received by the device from the beacon transmitter.

10. The system of claim 7, wherein:
    (a) the device comprises a satellite navigation signal receiver module for determining a position of the device based on the satellite navigation signal;
    (b) the method comprises the further steps of:
        (i) calculating a distance, $D_{SNS}$, between the position of the device based on the satellite navigation signal and the initial value for the calculated position of the device; and
        (ii) calculating a correction, $\Delta_{SNS}$, to the calculated position of the device, based on a quantitative relationship $\Delta_{SNS}=K_{SNS}\times D_{SNS}$, wherein $K_{SNS}$ is a constant based on a quantitative relationship that negatively correlates $K_{SNS}$ to at least one or both of:
            (A) an elapsed time since a previous satellite navigation signal was received by the device; and
            (B) an accuracy of the position of the device based on the satellite navigation signal; and
    (c) the step of calculating the corrected calculated position of the device is further based on the correction, $\Delta_{SNS}$.

11. The system of claim 7, wherein the constant $K_{SNS}$ is based on the quantitative relationship that negatively correlates $K_{SNS}$ to the elapsed time since the previous satellite navigation signal was received by the device.

12. The system of claim 7, wherein the constant $K_{SNS}$ is based on the quantitative relationship that negatively correlates $K_{SNS}$ to the accuracy of the position of the device based on the satellite navigation signal.

13. A computer program product for determining a position of either a worker or a rail vehicle, for use with a device adapted to be either carried by the worker or placed onboard the rail vehicle, the device comprising a receiver for receiving a beacon signal from each of a plurality of beacon transmitters, the computer program product comprising a non-transient computer readable medium storing instructions executable by at least one processor to implement a method comprising the steps of:
    (a) for each one of the beacon transmitters:
        (i) determining a power level of the beacon signal as received at the device from the one of the beacon transmitters;
        (ii) calculating an estimated distance, $D_1$, between the beacon transmitter and an initial value for a calculated position of the device based on the power level of the beacon signal received from the beacon transmitter;
        (iii) calculating a distance, $D_2$, between the beacon transmitter and the initial value for the calculated position of the device;
        (iv) calculating a correction, $\Delta_B$, to the initial value of the calculated position of the device, based on a quantitative relationship in the form $\Delta_B=K_3\times(D_2-D_1)$, wherein $K_B$ is a constant based on a quantitative relationship that negatively correlates $K_B$ to at least one or both of:
            (A) the measured power level of the beacon signal received from the beacon transmitter; and
            (B) an elapsed time since a previous beacon signal was last received by the device from the beacon transmitter;
    (b) calculating a corrected calculated position of the device based on the initial value of the calculated position of the device and the corrections, $\Delta_B$; and
    (c) outputting the corrected calculated position of the device as the position of the worker or the rail vehicle.

14. The computer program product of claim 13, wherein the constant, $K_3$, is based on the quantitative relationship that negatively correlates $K_3$ to the measured power level of the beacon signal received from the beacon transmitter.

15. The computer program product of claim 13, wherein the constant, $K_3$, is based on the quantitative relationship that negatively correlates $K_3$ to the elapsed time since the previous beacon signal was last received by the device from the beacon transmitter.

16. The computer program product of claim 13, wherein the device comprises a satellite navigation signal receiver module for determining a position of the device based on the satellite navigation signal, and wherein:
    (a) the method comprises the further steps of:
        (i) calculating a distance, $D_{SNS}$, between the position of the device based on the satellite navigation signal and the initial value for the calculated position of the device; and
        (ii) calculating a correction, $\Delta_{SNS}$, to the calculated position of the device, based on a quantitative relationship $\Delta_{SNS}=K_{SNS}\times D_{SNS}$, wherein $K_{SNS}$ is a constant based on a quantitative relationship that negatively correlates $K_{SNS}$ to at least one or both of:
            (A) an elapsed time since a previous satellite navigation signal was received by the device; and
            (B) an accuracy of the position of the device based on the satellite navigation signal; and
    (b) the step of calculating the corrected calculated position of the device is further based on the correction, $\Delta_{SNS}$.

17. The computer program product of claim 13, wherein the constant $K_{SNS}$ is based on the quantitative relationship that negatively correlates $K_{SNS}$ to the elapsed time since the previous satellite navigation signal was received by the device.

18. The computer program product of claim 13, wherein the constant $K_{SNS}$ is based on the quantitative relationship that negatively correlates $K_{SNS}$ to the accuracy of the position of the device based on the satellite navigation signal.

* * * * *